United States Patent
Feyen et al.

(10) Patent No.: US 11,298,656 B2
(45) Date of Patent: Apr. 12, 2022

(54) COPPER-PROMOTED GMELINITE AND USE THEREOF IN THE SELECTIVE CATALYTIC REDUCTION OF NOX

(71) Applicant: BASF Corporation, Florham Park, NJ (US)

(72) Inventors: Mathias Feyen, Laudenbach (DE); Ulrich Mueller, Neustadt (DE); Faruk Oezkirim, Ludwigshafen (DE); Stefan Dumser, Ludwigshafen (DE); Natalia Trukhan, Ludwigshafen (DE); Michaela Maltry, Hessheim (DE); Stefan Maurer, Shanghai (CN)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 16/304,511

(22) PCT Filed: Jun. 2, 2017

(86) PCT No.: PCT/CN2017/087036
§ 371 (c)(1),
(2) Date: Nov. 26, 2018

(87) PCT Pub. No.: WO2017/211237
PCT Pub. Date: Dec. 14, 2017

(65) Prior Publication Data
US 2019/0134564 A1   May 9, 2019

(30) Foreign Application Priority Data

Jun. 8, 2016 (WO) ................ PCT/CN2016/085287

(51) Int. Cl.
*B01J 29/80* (2006.01)
*B01D 53/94* (2006.01)
(Continued)

(52) U.S. Cl.
CPC ......... *B01D 53/9418* (2013.01); *B01D 53/56* (2013.01); *B01D 53/60* (2013.01); *B01D 53/9413* (2013.01); *B01J 29/76* (2013.01); *B01J 29/763* (2013.01); *B01J 29/80* (2013.01); *B01J 35/0033* (2013.01); *B01J 37/30* (2013.01); *C01B 39/023* (2013.01); *B01D 2251/2062* (2013.01); *B01D 2255/20738* (2013.01); *B01D 2255/20761* (2013.01); *B01D 2255/50* (2013.01); *B01D 2255/92* (2013.01); *B01D 2258/012* (2013.01); *B01J 2229/186* (2013.01); *B01J 2229/62* (2013.01)

(58) Field of Classification Search
CPC .... B01J 29/005; B01J 29/047; B01J 29/7065; B01J 29/86; B01J 29/87; B01J 29/89; B01J 29/76; B01J 29/763; B01J 29/80; B01J 2229/62; B01J 2229/186; B01J 2229/18; B01J 2229/183; B01J 35/0006; B01J 37/30; C01B 39/023; C01B 39/06; C01B 39/065; C01B 39/12; C01B 39/46; B01D 53/9418; B01D 53/9413; B01D 53/56; B01D 53/60; B01D 2255/50; B01D 2255/20761; B01D 2255/20738; B01D 2255/92; B01D 2255/904; B01D 2258/012; B01D 2257/102; B01D 2251/2062
USPC ...... 502/60, 61, 64, 66, 67, 69, 74; 423/700, 423/713

See application file for complete search history.

(56) References Cited

U.S. PATENT DOCUMENTS 4,061,717 A * 12/1977 Kerr .................. B01J 29/06
423/702
7,998,443 B2 8/2011 Andersen et al.
(Continued)

FOREIGN PATENT DOCUMENTS

CN 102821847 A 12/2012
CN 102869427 A 1/2013
(Continued)

OTHER PUBLICATIONS

International Search Report dated Sep. 13, 2017 in PCT/CN2017/087036.
International Preliminary Report on Patentability and Written Opinion dated Dec. 20, 2018 in PCT/CN2017/087036.
U.S. Appl. No. 15/509,527, filed Mar. 8, 2017, US 2017-0246620 A1, Parvulescu, Andrei-Nicolae, et al.
U.S. Appl. No. 15/550,581, filed Aug. 11, 2017, US 2018-0036723 A1, Riedel, Dominic, et al.
U.S. Appl. No. 15/316,220, filed Dec. 5, 2016, US 2018-0134570 A1, Maurer, Stefan, et al.
(Continued)

*Primary Examiner* — Elizabeth D Wood
(74) *Attorney, Agent, or Firm* — Finnegan, Henderson, Farabow, Garrett & Dunner LLP

(57) ABSTRACT

A catalyst for the selective catalytic reduction of NOx comprises a zeolitic material which comprises (A) one or more zeolites having a GME framework structure containing $YO_2$ and $X_2O_3$, and optionally further comprises one or more zeolites having a CHA framework structure containing $YO_2$ and $X_2O_3$, and/or comprises, (B) one or more zeolite intergrowth phases of one or more zeolites having a GME framework structure containing $YO_2$ and $X_2O_3$ and one or more zeolites having a CHA framework structure containing $YO_2$ and $X_2O_3$, wherein Y is a tetravalent element, and X is a trivalent element, and the zeolitic material contains Cu and/or Fe as non-framework elements in an amount ranging from 0.1 to 15 wt. % calculated as the element and based on 100 wt. % of YO contained in the zeolitic material. Also provided are a process for its preparation, and a use in a method for the selective catalytic reduction of NOx.

19 Claims, 6 Drawing Sheets

(51) Int. Cl.
- *B01J 37/30* (2006.01)
- *B01D 53/56* (2006.01)
- *B01J 29/76* (2006.01)
- *C01B 39/02* (2006.01)
- *B01J 35/00* (2006.01)
- *B01D 53/60* (2006.01)

(56) References Cited

U.S. PATENT DOCUMENTS

| | | | |
|---|---|---|---|
| 8,809,217 B2 | 8/2014 | Andersen et al. | |
| 8,932,973 B2 * | 1/2015 | Andersen | B01J 29/80 |
| | | | 502/60 |
| 9,616,420 B2 | 4/2017 | Chandler et al. | |
| 2005/0100493 A1 | 5/2005 | Yaluris et al. | |
| 2005/0100494 A1 | 5/2005 | Yaluris et al. | |
| 2010/0067548 A1 | 3/2010 | Song et al. | |
| 2012/0014865 A1 | 1/2012 | Bull et al. | |
| 2012/0184429 A1 * | 7/2012 | Andersen | B01D 53/9418 |
| | | | 502/61 |
| 2012/0189518 A1 * | 7/2012 | Andersen | B01J 29/005 |
| | | | 423/213.5 |
| 2012/0275977 A1 | 11/2012 | Chandler et al. | |
| 2013/0017063 A1 | 1/2013 | Tay et al. | |
| 2013/0136677 A1 | 5/2013 | Chandler et al. | |
| 2015/0141237 A1 * | 5/2015 | Andersen | B01J 29/78 |
| | | | 502/67 |
| 2015/0367336 A1 * | 12/2015 | Trukhan | B01D 53/9477 |
| | | | 423/239.2 |
| 2015/0367337 A1 | 12/2015 | Yang et al. | |
| 2017/0209857 A1 | 7/2017 | Chandler et al. | |
| 2017/0304812 A1 * | 10/2017 | Casci | B01D 53/02 |

FOREIGN PATENT DOCUMENTS

| | | |
|---|---|---|
| DE | 10 2006 060 807 A1 | 6/2008 |
| RU | 2 387 480 C2 | 10/2008 |
| WO | WO 2006/011870 A1 | 2/2006 |
| WO | WO 2009/141324 A1 | 11/2009 |
| WO | WO 2013/068976 A1 | 5/2013 |
| WO | WO 2013/118063 A1 | 8/2013 |
| WO | WO 2015/172000 A1 | 11/2015 |
| WO | WO 2015/195809 A1 | 12/2015 |
| WO | WO 2015/195819 A1 | 12/2015 |

OTHER PUBLICATIONS

U.S. Appl. No. 16/202,918, filed Nov. 28, 2018, Maurer, Stefan, et al.
U.S. Appl. No. 15/549,905, filed Aug. 9, 2017, US 2018-0022611 A1, Feyen, Mathias et al.
U.S. Appl. No. 15/752,991, filed Feb. 15, 2016, US 2018-0243691 A1, Mueller, Ulrich, et al.
U.S. Appl. No. 15/518,945, filed Apr. 13, 2017, US 2017-0225959 A1, Maurer, Stefan, et al.
U.S. Appl. No. 15/524,484, filed May. 4, 2017, US 2017-0336030 A1, Weickert, Matthias, et al.
U.S. Appl. No. 15/779,218, filed May 25, 2018, US 2018-0345245 A1, Maurer, Stefan, et al.
U.S. Appl. No. 15/508,725, filed Mar. 3, 2017, US 2017-0275076 A1, Edgington, Todd, et al.
U.S. Appl. No. 15/521,924, filed Apr. 26, 2017, US 2018-0230117 A1, Teles, Joaquim, et al.
U.S. Appl. No. 15/744,324, filed Jan. 12, 2018, US 2018-0208532 A1, Parvulescu, Andrei-Nicolae, et al.
U.S. Appl. No. 16/086,251, filed Sep. 18, 2018, Kalo, Benedikt, et al.
U.S. Appl. No. 15/571,107, filed Nov. 1, 2017, US 2018-0170850 A1, Vautravers, Nicolas, et al.
U.S. Appl. No. 15/779,314, filed May 25, 2018, US 2018-0333696 A1, Burckhart, Julia, et al.
U.S. Appl. No. 16/060,260, filed Jun. 7, 2018, US 2018-0362353 A1, Vautravers, Nicolas, et al.
U.S. Appl. No. 16/076,600, filed Aug. 8, 2018, Riedel, Dominic, et al.
U.S. Appl. No. 15/775,657, filed May. 11, 2018, US 2018-0328601 A1, Weickert, Matthias, et al.
U.S. Appl. No. 16/060,739, filed Jun. 8, 2018, US 2018-0362357 A1, Feyen, Mathias, et al.
U.S. Appl. No. 16/060,229, filed Jun. 7, 2018, US 2018-0362351 A1, Parvulescu, Andrei-Nicolae, et al.

* cited by examiner

COPPER-PROMOTED GMELINITE AND USE THEREOF IN THE SELECTIVE CATALYTIC REDUCTION OF NOX

TECHNICAL FIELD

The present invention relates to a process for the production of a catalyst for the selective catalytic reduction of $NO_x$ comprising one or more copper and/or iron containing zeolites having a GME framework structure and/or one or more zeolite intergrowth phases of one or more zeolites having a GME framework structure and one or more zeolites having a CHA framework structure, to a catalyst as obtainable or obtained according to said process, as well as to the catalyst per se per se. Furthermore, the present invention relates to a process for the selective catalytic reduction of $NO_x$ employing the inventive catalyst as well as to the use of the inventive catalyst.

INTRODUCTION

Zeolites containing copper and/or iron have found wide use in the field of selective catalytic reduction of nitrogen oxides ($NO_x$) contained in exhaust gases, and in particular in exhaust gas stemming from diesel engines and lean burn gasoline engines. Prominent examples of the zeolites which find use in these applications are copper and/or iron containing zeolites of the CHA and BEA structure types, and in particular Chabazite and zeolite beta ion-exchanged with one or both of said metals.

Thus, WO 2009/141324 A1 relates to a process for the direct synthesis of Cu containing zeolites having CHA structure and to their use in the selective catalytic reduction of $NO_x$ in exhaust gas. WO 2013/118063 A1 concerns iron- and copper-containing zeolite beta from organotemplate-free synthesis and its use in the selective catalytic reduction of $NO_x$.

US 2012/0014865 A1 for example relates to copper containing ZSM-34, which is a zeolitic material of the ERI/OFF structure type, and to its use in the treatment of gaseous streams containing $NO_x$.

WO 2006/11870 A1, US 2005/0100494 A1, and US 2005/0100493 A1 respectively relate to a process of reducing the content of $NO_x$ emissions and gas phase reduced nitrogen species produced during catalyst regeneration in fluid catalytic cracking, wherein a variety of zeolites and platinum group metals may be contained in the catalytically active component employed to this effect, zeolites having the FER structure type being preferably used.

WO 2015/172000 A1 concerns a catalyst article containing an SCR catalyst which in turn comprises a small, medium, and/or large pore molecular sieve selected from a large number of possible zeolitic materials and intergrowths thereof, copper Chabazite being employed in the particularly preferred embodiments thereof in the experimental section.

WO 2015/195819 A1 and US 2015/0367337 A1 respectively relate to an SCR catalyst comprising a zeolitic framework material which is isomorphously substituted with a tetravalent element and is promoted with a metal selected from a group including copper and iron, wherein the framework is selected from a lengthy list of framework types, amongst which CHA is particularly preferred.

WO 2015/195809 A1 and US 2015/0367336 A1 respectively concern a material for selective catalytic reduction of nitrogen oxides including an agglomeration of crystals of a molecular sieve selected again from a lengthy list of framework types, wherein CHA, and in particular SSZ-13 and SSZ-62 are particularly preferred.

DE 10 2006 060 807 A1 relates to a method for ion-exchanging a zeolitic material, wherein the zeolitic material is selected from an exhaustive list of possible framework structures, zeolitic materials having the MOR or MFI framework structure being particularly preferred.

WO 2013/068976 A1, on the other hand, concerns an organotemplate-free synthetic process for the production of a zeolitic material of the CHA-type framework structure.

Finally, US 2012/0189518 A1 concerns a catalyst for the selective catalytic reduction of $NO_x$ having one or more transition metals selected from a list including iron and copper, wherein the molecular sieve has at least one intergrowth phase of at least two different small-pore, three-dimensional framework structures. Preferred intergrowth phases disclosed in said document are selected from the group consisting of AEI, GME, AFX, AFT and LEV with CHA as the second framework structure of the respective intergrowth phase, wherein the intergrowth phase between AEI and CHA is particularly preferred, wherein the respective framework structures are silicoaluminophosphates, wherein it is further preferred that latter silicoaluminophosphate intergrowth phase contains copper or iron inside the pores and/or on the surface of thereof.

In view of increasingly restrictive emissions regulations for $NO_x$ emissions, in particular in the field of automotive exhaust gas emissions, there is however an ongoing need for the provision of more efficient calayst materials which are active in the fresh and aged states in order to meet current and future requirements and regulations. In particular, there is a need for new zeolitic materials which in combination with catalytic metals provide levels of exhaust gas treatment efficiencies which compare to the levels achieved by the current bench-mark catalysts yet may be obtained at lower cost and/or only necessitate a fraction of the catalytic metal loading currently required. Furthermore, there is a constant need for new zeolitic materials which outperform the currently used materials such as copper Chabazite and iron zeolite beta.

DETAILED DESCRIPTION

It is therefore an object of the present invention to provide a catalyst for the selective catalytic reduction of $NO_x$ displaying an improved activity towards the reduction of $NO_x$ compared to the catalysts currently employed. Thus it has surprisingly been found that a catalyst for the selective catalytic reduction of $NO_x$ comprising a copper and/or iron containing zeolite having a GME framework structure as such or as part of a zeolite intergrowth phase of a zeolite having a CHA framework structure displays an improved $NO_x$ conversion activity, in particular at high operation temperatures. In addition thereto, it has quite unexpectedly been found, that the aforementioned catalyst displays a high resistance to aging, the improved $NO_x$ conversion activity being substantially maintained after extensive aging regimens.

Therefore, the present invention relates to a process for the production of a catalyst for the selective catalytic reduction of $NO_x$ comprising a zeolitic material, said zeolitic material comprising (A) one or more zeolites having a GME framework structure containing $YO_2$ and $X_2O_3$, and optionally further comprising one or more zeolites having a CHA framework structure containing $YO_2$ and $X_2O_3$ and/or comprising (B) one or more zeolite intergrowth phases of one or more zeolites having a GME framework structure containing $YO_2$ and $X_2O_3$ and one or more zeolites having a CHA framework structure containing $YO_2$ and $X_2O_3$, wherein Y is a tetravalent element, and X is a trivalent element, and wherein said process comprises:

(i) preparing a mixture comprising at least one source of $YO_2$, at least one source of $X_2O_3$, and optionally comprising seed crystals;

(ii) crystallizing the mixture prepared in (i) for obtaining a zeolitic material comprising one or more zeolites having a GME framework structure and optionally further comprising one or more zeolites having a CHA framework structure, and/or for obtaining a zeolitic material comprising one or more zeolite intergrowth phases of one or more zeolites having a GME framework structure and one or more zeolites having a CHA framework structure;

(iii) optionally isolating the zeolitic material obtained in (ii);

(iv) optionally washing the zeolitic material obtained in (ii) or (iii);

(v) optionally drying the zeolitic material obtained in (ii), (iii), or (iv);

(vi) subjecting the zeolitic material obtained in (ii), (iii), (iv), or (v) to an ion-exchange procedure, wherein at least one ionic non-framework element or compound contained in the zeolitic material is ion-exchanged against Cu and/or Fe, preferably against Cu.

According to the present invention it is preferred that the mixture prepared in (i) is crystallized in (ii) for obtaining a zeolitic material comprising one or more zeolites having a GME framework structure and further comprising one or more zeolites having a CHA framework structure, and/or for obtaining a zeolitic material comprising one or more zeolite intergrowth phases of one or more zeolites having a GME framework structure and one or more zeolites having a CHA framework structure.

As regards the preferred embodiments of the inventive process wherein the zeolitic material obtained in (ii) comprises one or more zeolites having a CHA framework structure as such or as contained in one or more zeolite intergrowth phases of one or more zeolites having a GME framework structure and one or more zeolites having a CHA framework structure, there is, in principle, no restriction relative to the amounts in which the CHA framework structure may be contained in said zeolitic material. Thus, by way of example, the relative amount of the CHA framework structure in the zeolitic material obtained in (ii), and preferably in the zeolitic material as obtained in (v) or (vi), comprising the one or more zeolites having a GME framework structure and the one or more zeolites having a CHA framework structure and/or the one or more zeolite intergrowth phases thereof may range anywhere from 0.5 to 99% based on 100% of the phases in the zeolitic material having a GME and/or CHA framework structure, wherein according to the present invention it is preferred that the relative amount ranges from 1 to 95%, and more preferably from 5 to 80%, more preferably from 10 to 60%, more preferably from 15 to 50%, and more preferably from 20 to 45%. According to the inventive process it is particularly preferred that the relative amount of the CHA framework structure in the zeolitic material obtained in (ii), and preferably in the zeolitic material as obtained in (v) or (vi), comprising the one or more zeolites having a GME framework structure and the one or more zeolites having a CHA framework structure and/or the one or more zeolite intergrowth phases thereof ranges from 25 to 40% based on 100% of the phases in the zeolitic material having a GME and/or CHA framework structure. As regards the values for the relative amount of the CHA framework structure in the zeolitic material obtained in (ii), and preferably in the zeolitic material as obtained in (v) or (vi), although there is no particular restriction as to the method according to which said relative amount is determined, it is preferred according to the present invention that the values thereof as defined in the present application reflect the values as determined from the X-ray powder diffraction pattern of the zeolitic material obtained in (ii), and preferably using the zeolitic material as obtained in (v) or (vi), using the Relative Intensity Ratio (RIR) method, and based on 100% of the phases in the zeolitic material having a GME and/or CHA framework structure. Within the meaning of the present invention, it is preferred that the Relative Intensity Ratio (RIR) method refers to the method as described in described in Chung, F. H. in Journal of Applied Crystallography, Volume 7, Issue 6, pages 519-525, December 1974, wherein more preferably the RIR method refers to the method as described in the experimental section of the present application.

It is, however, alternatively preferred according to the present invention that the mixture prepared in (i) is crystallized in (ii) for obtaining a zeolitic material comprising one or more zeolites having a GME framework structure, wherein the zeolitic material contains substantially no zeolites and/or no zeolite phases having a CHA framework structure, and preferably contains substantially no zeolites and no zeolite phases having a CHA framework structure. According to the present invention, the term "substantially no zeolites having a CHA framework structure" as well as the term "substantially no zeolite phases having a CHA framework structure" indicates an amount of 0.1 wt.-% or less of zeolites and/or zeolite phases having a CHA framework structure in the zeolitic material comprised in the catalyst based on 100 wt.-% of the zeolitic material, and preferably based on 100 wt.-% of the zeolitic material after isolation, washing, drying, and calcination thereof. It is, however, preferred according to the present invention that the aforementioned terms indicate an amount of 0.05 wt.-% or less of zeolites and/or zeolite phases having a CHA framework structure in the zeolitic material comprised in the catalyst, and more preferably of 0.001 wt.-% or less, more preferably 0.0005 wt.-% or less, and even more preferably 0.0001 wt.-% or less thereof. Alternatively, according to the present invention the terms "substantially no zeolites having a CHA framework structure" as well as the term "substantially no zeolite phases having a CHA framework structure" respectively indicate a relative amount of CHA framework structure in the zeolitic material comprising one or more zeolites having a GME framework structure and/or in the one or more zeolite intergrowth phases thereof of less than 0.5% as determined using the X-ray powder diffraction pattern of the zeolitic material using the Relative Intensity Ratio (RIR) method, and based on 100% of the phases in the zeolitic material having a GME framework structure, and preferably of less than 0.1%, more preferably of 0.05%, and more preferably of 0.01%.

In general, zeolites and zeolitic materials may be ordered or disordered. Ordered zeolites and zeolitic materials are crystal structures which are periodically ordered in 3-dimensions. These structures are classified based on their repeating periodic building units and may be termed "end-member structures" if periodic ordering occurs in all three dimensions. Disordered molecular sieves, on the other hand, may only show periodic ordering in one or two dimensions. In disordered structures, the stacking sequence of the repeating periodic building units deviates from periodic ordering. This may also be explained as a structural or stacking disorder of structurally invariant periodic building units. According to the present invention, the one or more zeolites comprised in the inventive zeolitic material may have a defect or disorder including, but not limited to, stacking disorders, planar faults, and intergrowth of phases. In a layered structure with a stacking disorder, a single framework type may deviate from periodic ordering. A planar fault in the framework structure may include, for example, structures on either side of the plane which are mirror images or rotation of one part of a crystal, on a specific plane, with respect to another. An intergrowth of phases may include a transition from one framework structure to another framework structure. Thus, the zeolitic material may include any one or more types of defects or disorders leading to any conceivable disordered framework(s). According to alternatively preferred embodiments of the present invention wherein the inventive zeolitic material comprises on or more zeolite intergrowth phases of one or more zeolites having a GME framework structure and one or more zeolites having a CHA framework structure, the intergrowth GME-CHA phases may comprise regions of GME framework sequences and regions of CHA framework sequences. Each change from a GME to a CHA framework type sequence may result in a stacking fault, as an example of a disorder. In an exemplary embodiment according to said alternatively preferred embodiments, the disorder of the zeolitic material comprises an intergrowth of a phase of GME and of a phase of CHA forming a single intergrown crystal comprising two different framework structures. Thus, the zeolitic material according to said alternatively preferred embodiments comprises at least one intergrowth phase of said two different framework structures. Said intergrowth phase may include an area of the crystal where the GME framework structure is transitioned to the CHA framework structure, and vice versa. In other words, the intergrowth phase may be a part of the crystal structure which serves to complete both types of frameworks, such that the zeolitic material may include one or more intergrown regions in addition to the GME and CHA framework structures throughout the zeolitic material.

As regards the preparation of the mixture in (i), no particular restrictions applied either to the order in which the individual components are added for preparing the mixture, nor with respect to the method according to which the components are admixed for providing a homogenous mixture thereof. According to the present invention it is however preferred that the preparation of the mixture in (i) does not involve the addition and/or use of an organic structure directing agent of any kind. Within the meaning of the present invention, the term "organic structure directing agent" refers to any organic template compound containing at least carbon and preferably containing both carbon and nitrogen which may act as a structure directing agent in the preparation of a zeolite. It is, however, preferred according to the present invention that the absence of an organic structure directing agent in the mixture prepared in (i) does not encompass the seed crystals optionally provided in (i) which themselves may still contain an organic structure directing agent used in their preparation. Consequently, the preferred preparation of a mixture in (i) in the absence of an organic structure directing agent within the meaning of the present invention does not exclude the use of seed crystals which may contain an organic structure directing agent from their own synthesis. It must be noted, however, that according to said preferred embodiments, the exceptional presence of an organic structure directing agent is exclusively restricted to organic structure directing agent materials still contained in the micropores of the seed crystals.

Concerning the crystallization of the mixture prepared in (i) for obtaining a zeolitic material in (ii), there is again no restriction whatsoever as to how said crystallization is achieved such that any suitable means to this effect may effectively be employed in the present invention. As for the preparation of the mixture in (i), however, it is accordingly preferred that also the crystallization of the mixture in (ii) does not involve the addition and/or use of an organic structure directing agent of any kind with the sole exception of organic structure directing agents which may still be contained within the micropores of seed crystals preferably provided to the mixture in (i) and/or added as a crystallization auxiliary in (ii).

Thus, according to the inventive process, at no point does the mixture prepared in (i) and crystallized in (ii) contain more than an impurity of an organic structure directing agent specifically used in the synthesis of zeolitic materials having an GME and/or CHA-type framework structure, in particular specific tetraalkylammonium compounds, dialkyl amines, heterocyclic amines, and combinations of two or more thereof. Thus, by way of example, at no point does the mixture prepared in (i) and crystallized in (ii) contain more than an impurity of one or more organic structure directing agents selected from the group consisting of tetra($C_1$-$C_5$) alkylammonium compounds, di($C_1$-$C_5$)alkyl amines, oxygen containing heteroxyclic amines with 5 to 8 ring members, and combinations of two or more thereof, more preferably from the group consisting of tetra($C_2$-$C_4$)alkylammonium compounds, di($C_2$-$C_4$)alkyl amines, oxygen containing heteroxyclic amines with 5 to 7 ring members, and combinations of two or more thereof, more preferably from the group consisting of tetra($C_2$-$C_3$)alkylammonium compounds, di($C_2$-$C_3$)alkyl amines, oxygen containing heteroxyclic amines with 5 or 6 ring members, and combinations of two or more thereof, and/or related organotemplates such as any suitable N-alkyl-3-quinuclidinol compound, N,N,N-trialkyl-exoaminonorbornane compound, N,N,N-trimethyl-1-adamantylammonium compound, N,N,N-trimethyl-2-adamantylammonium compound, N,N,N-trimethylcyclohexylammonium compound, N,N-dimethyl-3,3-dimethylpiperidinium compound, N,N-methylethyl-3,3-dimethylpiperidinium compound, N,N-dimethyl-2-methylpiperidinium compound, 1,3,3,6,6-pentamethyl-6-azonio-bicyclo(3.2.1)octane compound, N,N-dimethylcyclohexylamine compound, or any suitable N,N,N-trimethylbenzylammonium compound, including combinations of two or more thereof. As noted above, such an impurity can, for example, be caused by organic structure directing agents still present in seed crystals used in the inventive process. Organic structure directing agents eventually contained in seed crystals may not, however, participate in the crystallization process since they are trapped within the seed crystal framework and therefore may not act as structure directing agents within the meaning of the present invention.

Within the meaning of the present invention, an "organotemplate-free" synthetic process relates to a synthetic process wherein the materials used therein are substantially free of organic structure directing agents, wherein "substantially" as employed in the present invention with respect to the amount of one or more organic structure directing agents contained in the one or more materials used in a synthetic process indicates an amount of 0.1 wt.-% or less of one or more organic structure directing agents based on 100 wt.-% of the mixture prepared in (i), preferably 0.05 wt.-% or less, more preferably 0.001 wt.-% or less, more preferably 0.0005 wt.-% or less, and even more preferably 0.0001 wt.-% or less thereof. Said amounts of one or more organic structure directing agents, if at all present in any one of the materials used in the synthetic process, may also be denoted as "impurities" or "trace amounts" within the meaning of the present invention. Furthermore, it is noted that the terms "organotemplate" and "organic structure directing agent" are synonymously used in the present application.

Thus, the term "organotemplate" as employed in the present application designates any conceivable organic material which is suitable for template-mediated synthesis of a zeolite material, preferably of a zeolite material having a GME and/or CHA-type framework-structure, and even more preferably which is suitable for the synthesis of Gmelinite and/or Chabazite. Such organotemplates include e.g. any suitable tetraalkylammonium compound, dialkyl amine, heterocyclic amine, N-alkyl-3-quinuclidinol compound, N,N,N-trialkyl-exoaminonorbornane compound, N,N,N-trimethyl-1-adamantylammonium compound, N,N,N-trimethyl-2-adamantylammonium compound, N,N,N-trimethylcyclohexylammonium compound, N,N-dimethyl-3,3-dimethylpiperidinium compound, N,N-methylethyl-3,3-dimethylpiperidinium compound, N,N-dimethyl-2-methylpiperidinium compound, 1,3,3,6,6-pentamethyl-6-azonio-bicyclo(3.2.1)octane compound, N,N-dimethylcyclohexylamine compound, and any suitable N,N,N-trimethylbenzylammonium compound.

Therefore, it is preferred according to the present invention that the preparation of a zeolitic material according to the process defined in (i) and (ii) and preferably according to the inventive process as defined in particular and preferred embodiments of the present application is conducted in the absence of an organic structure directing agent and is thus an organotemplate-free synthetic process within the meaning of the present invention.

According to the present invention, the zeolitic material obtained in (ii) is preferably isolated in (iii). To this effect, any suitable procedure may be employed provided that the zeolitic material is effectively separated from other materials contained in the resulting reaction product of the crystallization in (ii). Isolation of the crystallized product can be achieved by any conceivable means. Preferably, isolation of the crystallized product can be achieved by means of filtration, ultrafiltration, diafiltration, centrifugation and/or decantation methods, wherein filtration methods can involve suction and/or pressure filtration steps. According to the inventive process, it is further preferred that in (iii) the zeolitic material obtained in (ii) is isolated by spray drying and/or spray granulation of the reaction product obtained in (ii), and preferably by directly subjecting the reaction product to spray drying and/or spray granulation without isolating, washing, or drying of the zeolitic material beforehand. Directly subjecting the mixture obtained (ii) of the inventive process to a spray drying and/or spray granulation stage has the advantage that isolation and drying is performed in a single stage.

Therefore, it is preferred according to the inventive process that in (iii) isolating the zeolitic material includes a step of spray-drying the zeolitic material obtained in (ii).

According to the present invention, the zeolitic material obtained in (ii) or (iii) is preferably washed in (iv). With respect to one or more preferred washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

Preferably, the zeolitic material obtained in (ii) or (iii) is washed until the pH of the washing agent, preferably the washwater, is in the range of from 6 to 8, preferably from 6.5 to 7.5, as determined via a standard glass electrode.

According to the present invention, the zeolitic material obtained in (ii), (iii), or (iv) is preferably dried in (v). In general, any conceivable means of drying can be used. Drying procedures preferably include heating and/or applying vacuum to the zeolitic material. In envisaged embodiments of the present invention, one or more drying steps may involve spray drying, preferably spray granulation of the zeolitic material.

In embodiments which comprise at least one drying step, the drying temperatures are preferably in the range of from 25° C. to 150° C., more preferably of from 60 to 140° C., more preferably of from 70 to 130° C. and even more preferably in the range of from 75 to 125° C. The durations of drying are preferably in the range of from 2 to 60 h, more preferably in the range of 6 to 48 hours, more preferably of from 12 to 36 h, and even more preferably of from 18 to 30 h.

According to the inventive process, it is further preferred that in (v) the zeolitic material obtained in (ii), (iii), or (iv) is dried by spray drying and/or spray granulation of the reaction product obtained in (ii), (iii), or (iv), and preferably by directly subjecting the reaction product to spray drying and/or spray granulation without isolating, washing, or drying of the zeolitic material before-hand.

Therefore, it is further or alternatively preferred according to the inventive process that in (v) drying of the zeolitic material includes a step of spray-drying the zeolitic material obtained in (ii), (iii), or (iv).

According to the inventive process, the zeolitic material obtained in (ii), (iii), (iv), or (v) is subject to an ion-exchange procedure, wherein it is ion-exchanged against copper and/or iron, preferably against copper. In general, any conceivable ion-exchange procedure can be conducted on the zeolitic material to this effect, provided that a copper and/or iron ion-exchanged zeolitic material is obtained. It is, however, preferred according to the present invention that the zeolitic material obtained in (ii), (iii), (iv), or (v) is first converted to the H-form, preferably via the ammonium form and subsequent calcination thereof for obtaining the H-form, prior to ion change with copper and/or iron.

Therefore, it is preferred according to the inventive process that in (vi) the step of subjecting the zeolitic material to an ion-exchange procedure includes the steps of (vi.a) subjecting the zeolitic material obtained in (ii), (iii), (iv), or (v) to an ion-exchange procedure, wherein at least one ionic non-framework element or compound contained in the zeolitic material is ion-exchanged against $NH_4^+$;

(vi.b) calcining the ion-exchanged zeolitic material obtained in (vi.a) for obtaining the H-form of the zeolitic material;

(vi.c) subjecting the zeolitic material obtained in (vi.b) to an ion-exchange procedure, wherein H+ contained in the zeolitic material as ionic non-framework element is ion-exchanged against Cu and/or Fe.

As regards the amount of copper and/or iron which is ion exchanged into the zeolitic material according to the inventive process, no particular restrictions apply such that in principle, any conceivable amount of copper and/or iron may be exchanged therein. Thus, by way of example, the zeolitic material may be ion exchanged in (vi) such as to obtain a loading of Cu and/or Fe in the zeolitic material ranging from 0.1 to 15 wt.-% calculated as the element and based on 100 wt.-% of $YO_2$ contained in the zeolitic material. It is, however, preferred according to the inventive process that the zeolitic material is ion exchanged such as to obtain a loading of copper and/or iron ranging from 0.5 to 10 wt.-%, and more preferably from 1 to 8 wt.-%, more preferably from 1.5 to 6 wt.-%, more preferably from 2 to 5 wt.-%, more preferably from 2.5 to 4.5 wt.-%, more preferably from 3 to 4 wt.-%, and more preferably from 3.3 to 3.8 wt.-%. According to the inventive process it is particularly preferred that the zeolitic material is ion exchanged in (vi) such as to obtain a loading of copper and/or iron ranging from 3.5 to 3.7 wt.-% calculated as the element and based on 100 wt.-% of $YO_2$ contained in the zeolitic material.

Concerning the state in which copper and/or iron is ion exchanged into the zeolitic material, it is noted that no particular restrictions apply according to the present invention. Thus, in principle, copper and iron may be ion exchanged as $Cu+$, $Cu^{2+}$, $Fe^{2+}$, and/or $Fe^{3+}$, respectively, wherein it is however preferred according to the present invention that independently from one another copper is ion exchanged as $Cu^{2+}$ and iron is ion exchanged as $Fe^{2+}$.

According to the inventive process, a zeolitic material comprising $YO_2$ in the framework of the one or more zeolites having a GME framework structure and/or in an intergrowth phase thereof is crystallized in (ii). In principle, Y provided in (i) in the one or more sources for $YO_2$ stands for any conceivable tetravalent element, Y standing for either or several tetravalent elements. Preferred tetravalent elements according to the present invention include Si, Sn, Ti, Zr, and Ge, and combinations thereof. More preferably, Y stands for Si, Ti, or Sn, or any combination of said tetravalent elements, even more preferably for Si, and/or Sn. According to the present invention, it is particularly preferred that Y stands for Si.

According to the inventive process, one or more sources for $YO_2$ are provided in (i), wherein said one or more sources may be provided in any conceivable form provided that a zeolitic material having a GME framework structure and/or in an intergrowth phase thereof comprising $YO_2$ and $X_2O_3$ can be crystallized in (ii). Preferably, $YO_2$ is provided as such and/or as a compound which comprises $YO_2$ as a chemical moiety and/or as a compound which (partly or entirely) is chemically transformed to $YO_2$ during the inventive process. In preferred embodiments of the present invention, wherein Y stands for Si or for a combination of Si with one or more further tetravalent elements, the source for $SiO_2$ preferably provided in step (i) can also be any conceivable source. Thus, by way of example, the at least one source for $YO_2$ comprises one or more compounds selected from the group consisting of silicas, silicates, and mixtures thereof, wherein preferably the one or more compounds are selected from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, tetraalkoxysilanes, and mixtures of two or more thereof, more preferably from the group consisting of fumed silica, silica hydrosols, silica gel, silicic acid, water glass, colloidal silica, pyrogenic silica, silicic acid esters, tetraalkoxysilanes, and mixtures of two or more thereof, more preferably from the group consisting of silica hydrosols, silicic acid, water glass, colloidal silica, silicic acid esters, tetraalkoxysilanes, and mixtures of two or more thereof, more preferably from the group consisting of water glass, colloidal silica, silicic acid esters, tetraalkoxysilanes, and mixtures of two or more thereof more preferably from the group consisting of water glass, colloidal silica, and mixtures thereof, wherein more preferably the at least one source of $YO_2$ is selected from the group consisting of water glass, colloidal silica, and mixtures thereof, wherein more preferably water glass is employed as the source of $YO_2$.

Within the meaning of the present invention, the term "silicate" as a preferred source for $YO_2$ generally refers to any conceivable silicates, wherein according to a particularly preferred meaning of the present invention, the term "silicate" refers to the $[SiO_3]^{2-}$ anion comprised in the particularly preferred silicate compounds comprised in the one or more sources for $YO_2$.

According to the inventive process, a zeolitic material comprising $X_2O_3$ in the framework of the one or more zeolites having a GME framework structure and/or in an intergrowth phase thereof is crystallized in (ii). In principle, X provided in (i) in the one or more sources for $X_2O_3$ stands for any conceivable trivalent element, X standing for either one or several trivalent elements. Preferred trivalent elements according to the present invention include Al, B, In, and Ga, and combinations thereof. More preferably, X stands for Al, B, or In, or any combination of said trivalent elements, even more preferably for Al and/or B. According to the present invention, it is particularly preferred that X stands for Al.

In the process of the present invention, the one or more sources for $X_2O_3$ provided in (i) may be provided in any conceivable form, provided that a zeolitic material having a GME framework structure and/or in an intergrowth phase thereof comprising $YO_2$ and $X_2O_3$ can be crystallized in (ii). Preferably, $X_2O_3$ is provided as such and/or as a compound which comprises $X_2O_3$ as a chemical moiety and/or as a compound which (partly or entirely) is chemically transformed to $X_2O_3$ during the inventive process.

In preferred embodiments of the present invention, wherein X stands for Al or for a combination of Al with one or more further trivalent elements, the source for $Al_2O_3$ provided in (i) can be any conceivable source. Thus, by way of example, the at least one source for $X_2O_3$ comprises one or more aluminate salts. In this respect, any type of aluminum salts such as, for example, alkali metal aluminates, aluminum alcoholates, such as, for example, aluminum triisopropylate, or mixtures thereof. Preferably, the at least one source for $X_2O_3$ comprises one or more aluminum salts, preferably an aluminate of an alkali metal, wherein the alkali metal is preferably selected from the group consisting of Li, Na, K, Rb, and Cs, wherein more preferably the alkali metal is Na and/or K, and wherein even more preferably the alkali metal is Na. Thus, among the preferred alkali metal aluminates, the at least one source preferably comprises sodium and/or potassium aluminate, more preferably sodium aluminate. According to the inventive process it is particularly preferred that the source for $Al_2O_3$ is sodium aluminate.

According to the inventive process, no particular restrictions apply regarding the amounts of the one or more sources of $YO_2$ and $X_2O_3$ respectively provided for preparing the mixture in (i). Thus, as regards the $YO_2:X_2O_3$ molar ratio of the mixture prepared in (i), any suitable ratio may be chosen provided that one or more zeolites having a GME framework structure and/or an intergrowth phase thereof is crystallized in (ii). Thus, by way of example, the $YO_2:X_2O_3$ molar ratio of the mixture prepared in (i) may range anywhere from 2 to 50, and preferably ranges from 4 to 30, more preferably from 6 to 25, more preferably from 8 to 20, more preferably from 9 to 18, more preferably from 10 to 16, and more preferably from 10.5 to 14. According to the present invention it is particularly preferred that the $YO_2:X_2O_3$ molar ratio of the mixture prepared in (i) ranges from 11 to 12.

As regards the seed crystals which are preferably provided in the mixture obtained in (i), no particular restrictions apply such that in principle any suitable seed crystals may be included in the mixture prepared in (i) provided that one or more zeolites having a GME framework structure and/or in an intergrowth phase thereof is crystallized in (ii). In this respect, it is preferred according to the present invention that said seed crystals comprise one or more zeolites having a GME and/or CHA framework structure, wherein more preferably one or more zeolites having a CHA framework structure are employed as seed crystals for preparing the mixture in (i). As regards the one or more zeolites having a GME framework structure which are preferably employed as seed crystals, these may be selected from the group consisting of Gmelinite, [Be-P-O]-GME, K-rich Gmelinite, synthetic fault-free Gmelinite, and mixtures of two or more thereof, wherein preferably the one or more zeolites having a GME framework structure comprised in the seed crystals is Gmelinite. Same applies accordingly relative to the one or more zeolites having a CHA framework structure preferably comprised in the seed crystals which may be selected from the group consisting of (Ni (deta)$_2$)-UT-6, Chabazite, |Li-Na| [Al-Si-O]-CHA, DAF-5, Na-Chabazite, K-Chabazite, LZ-218, Linde D, Linde R, MeAPSO-47, Phi, SAPO-34, SAPO-47, SSZ-13, SSZ-62, UiO-21, Willhendersonite, ZK-14, ZYT-6, preferably from the group consisting of Chabazite, |Li-Na| [Al-Si-O]-CHA, Na-Chabazite, K-Chabazite, SAPO-34, SAPO-47, SSZ-13, SSZ-62, and combinations of two or more thereof, more preferably from the group consisting of Chabazite, |Li-Na| [Al-Si-O]-CHA, Na-Chabazite, SAPO-34, SSZ-13, and combinations of two or more thereof, and more preferably from the group consisting of Na-Chabazite, SAPO-34, SSZ-13, and combinations of two or more thereof. According to the present invention, it is however preferred that the one or more zeolites having the CHA framework structure comprised in the seed crystals is Chabazite. According to the present invention it is however alternatively preferred that the seed crystals comprise one or more zeolites having a GME framework structure, one or more zeolites having a CHA framework structure, and/or one or more zeolite intergrowth phases of one or more zeolites having a GME framework structure and one or more zeolites having a CHA framework structure, as obtained in (ii), (iii), (iv), or (v) according to any of the particular and preferred embodiments of the present invention.

Furthermore, no particular restrictions apply according to the present invention as to the amounts in which seed crystals are preferably added for preparing the mixture in (i). Thus, by way of example, the amount of seed crystals in the mixture prepared in (i) may range anywhere from 0.1 to 20 wt.-% based on 100 wt.-% of $YO_2$ contained in the mixture, wherein preferably the amount of seed crystals ranges from 0.5 to 15 wt.-%, more preferably from 1 to 12 wt.-%, more preferably from 1.5 to 10 wt.-%, more preferably from 2 to 8 wt.-%, and more preferably from 2.5 to 6 wt.-%. According to the present invention it is particularly preferred that 3 to 4 wt.-% of seed crystals are added for preparing the mixture in (i) based on 100 wt.-% of $YO_2$ contained in the mixture.

According to the present invention it is preferred that the mixture prepared in (i) further comprises a solvent system comprising one or more solvents. In this respect, any conceivable solvents may be used in any suitable amount, provided that one or more zeolites having a GME framework structure and/or in an intergrowth phase thereof is crystallized in (ii). Thus, by way of example, the one or more solvents may be chosen from polar protic solvents and mixtures thereof, wherein preferably the solvent system comprises one or more solvents selected from the group consisting of n-butanol, isopropanol, propanol, ethanol, methanol, water, and mixtures thereof, and more preferably from the group consisting of ethanol, methanol, water, and mixtures thereof, wherein more preferably the solvent system comprises water. According to the present invention it is particularly preferred that water is used as the solvent system in the mixture prepared in (i), preferably deionized water.

As regards the preferred embodiments of the present invention wherein the mixture prepared in (i) further comprises a solvent system, there is again no restriction relative to the amounts in which said solvent system may be employed. Thus, by way of example, in instances wherein the mixture prepared in (i) comprises water as the solvent system, the $H_2O:YO_2$ molar ratio of the mixture prepared in (i) may range anywhere from 3 to 28, wherein preferably the $H_2O:YO_2$ molar ratio ranges from 4 to 24, more preferably from 5 to 22, more preferably from 6 to 18, and more preferably from 7 to 14. According to particularly preferred embodiments of the present invention, the $H_2O:YO_2$ molar ratio of the mixture prepared in (i) ranges from 8 to 10.

Concerning the further components which may be comprised in the mixture prepared in (i), no restrictions applied such that in principle any conceivable further elements or compounds may be contained therein, again provided that one or more zeolites having a GME framework structure and/or an intergrowth phase thereof is crystallized in (ii). According to the present invention it is preferred that the mixture prepared in (i) further comprises one or more alkali metals M, and preferably one or more alkali metals M selected from the group consisting of Li, Na, K, Cs, and mixtures thereof. According to particularly preferred embodiments, the mixture prepared in (i) further comprises Na and/or K, wherein more preferably Na is comprised in the mixture as the alkali metal M.

It is, however, preferred according to the inventive process that the mixture prepared in (i) contains substantially no phosphorous or phosphorous containing compounds. Within the meaning of the present invention, "substantially" as employed in the present invention with respect to the amount of phosphorous contained in the one or more materials used in the inventive process indicates an amount of 0.1 wt.-% or less of phosphorous and/or phosphorous containing compounds based on 100 wt.-% of the mixture prepared in (i), preferably 0.05 wt.-% or less, more preferably 0.001 wt.-% or less, more preferably 0.0005 wt.-% or less, and even more preferably 0.0001 wt.-% or less thereof. Said amounts of phosphorous and/or phosphorous containing compounds, if at all present in any one of the materials used in the synthetic process, may also be denoted as "impurities" or "trace amounts" within the meaning of the present invention.

Accordingly it is further preferred that the framework of the zeolitic material obtained in (ii) contains substantially no phosphorous, wherein more preferably the zeolitic material obtained in (ii) contains substantially no phosphorous and/or phosphorous containing compounds. Within the meaning of the present invention, "substantially" as employed in the present invention with respect to the amount of phosphorous contained in the framework of the zeolitic material obtained in (ii) indicates an amount of 0.1 wt.-% or less of phosphorous calculated as the element and based on 100 wt.-% of $YO_2$ in the zeolitic material, preferably 0.05 wt.-% or less, more preferably 0.001 wt.-% or less, more preferably 0.0005 wt.-% or less, and even more preferably 0.0001 wt.-% or less thereof. Furthermore, within the meaning of the present invention, "substantially" as employed in the present invention with respect to the amount of phosphorous and/or phosphorous containing compounds contained in the zeolitic material obtained in (ii) indicates an amount of 0.1 wt.-% or less of phosphorous and/or phosphorous containing compounds based on 100 wt.-% of the zeolitic material after isolation, washing, drying, and calcination thereof, and preferably 0.05 wt.-% or less, more preferably 0.001 wt.-% or less, more preferably 0.0005 wt.-% or less, and even more preferably 0.0001 wt.-% or less thereof.

With respect to embodiments of the present invention wherein the mixture prepared in (i) comprises one or more alkali metals M, there is no particular restriction as to the amounts in which said one or more alkali metals may be contained in the mixture. Thus, by way of example, the $M:YO_2$ molar ratio in the mixture prepared in (i) may range anywhere from 0.1 to 2, wherein preferably the $M:YO_2$ molar ratio ranges from 0.3 to 1.5, and more preferably from 0.4 to 1.2, more preferably from 0.5 to 1, more preferably from 0.55 to 0.9, more preferably from 0.6 to 0.8. According to the inventive process it is particularly preferred that the $M:YO_2$ molar ratio in the mixture prepared in (i) ranges from 0.65 to 0.75.

Furthermore, as regards the $YO_2:X_2O_3:M$ molar ratio of the mixture prepared in (i) according to preferred embodiments of the present invention wherein the mixture prepared in (i), no particular restrictions apply according to the present invention provided that the given amounts are such that one or more zeolites having a GME framework structure and/or in an intergrowth phase thereof is crystallized in (ii). Thus, by way of example, the $YO_2:X_2O_3:M$ molar ratio of the mixture prepared in (i) may range anywhere from 1:(0.02-0.5):(0.1-2), wherein preferably the $YO_2:X_2O_3:M$ molar ratio ranges from 1:(0.035-0.25):(0.3-1.5), more preferably from 1:(0.05-0.125):(0.4-1.2), more preferably from 1:(0.055-0.11):(0.5-1), more preferably from 1:(0.065-0.1):(0.55-0.9), and more preferably from 1:(0.075-0.095):(0.6-0.8). According to the inventive process it is however particularly preferred that the $YO_2:X_2O_3:M$ molar ratio of the mixture prepared in (i) ranges from 1:(0.085-0.09):(0.65-0.75).

Concerning the crystallization in (ii), as noted above, there is no restriction whatsoever as to how said crystallization is achieved such that any suitable means to this effect may effectively be employed, provided of course that one or more zeolites having a GME framework structure and/or in an intergrowth phase thereof is crystallized. According to the present invention it is however preferred that crystallization in (ii) involves heating of the mixture prepared in (i). Concerning the temperature to which the mixture prepared in (i) is heated in (ii), any suitable temperature may be applied, wherein it is preferred according to the inventive process that the temperature ranges from 75 to 210° C., and more preferably from 85 to 190° C., more preferably from 90 to 170° C., more preferably from 95 to 150° C., and more preferably from 100 to 140° C. According to the inventive process it is particularly preferred that the crystallization of the mixture prepared in (i) is achieved in (ii) by heating thereof to a temperature ranging from 110 to 130° C.

As regards the further parameters employed for crystallization of the mixture prepared in (i) in (ii) of the inventive process, again no particular restrictions apply provided that one or more zeolites having a GME framework structure and/or in an intergrowth phase thereof may be crystallized. Consequently, as regards the pressure which is employed in (ii) and in particular the pressure in instances wherein the mixture is heated for crystallization, any suitable pressure may be applied to this effect. It is, however, preferred according to the inventive process that crystallization in step (ii) is conducted under autogenous pressure. In instances wherein the mixture prepared in (i) comprises a solvent system, it is accordingly preferred that crystallization in (ii) is conducted under solvothermal conditions, wherein in instances wherein the solvent system comprises water, it is accordingly preferred that crystallization in (ii) is conducted under hydrothermal conditions.

Furthermore, in instances wherein the mixture prepared in (i) is heated in (ii) for crystallization thereof, there is no particular restriction as to the duration of the heating provided again that one or more zeolites having a GME framework structure and/or in an intergrowth phase thereof may be crystallized. Thus, by way of example, crystallization in step (ii) may involve heating of the mixture prepared in (i) for a period ranging anywhere from 24 to 240 h, wherein preferably the mixture prepared in (i) is heated for a period ranging from 36 to 200 h, and more preferably from 48 to 180 h, more preferably from 75 to 160 h. According to the inventive process it is particularly preferred that crystallization in (ii) of the mixture prepared in (i) involves the heating of said mixture for a duration ranging from 100 to 140 h.

According to the inventive process it is further preferred that the crystallization in step (ii) involves agitating the mixture, preferably by stirring.

There is no particular restriction according to the present invention as to the specific types of zeolites having a GME framework structure and/or an intergrowth phase thereof which may be crystallized according to the inventive process. Thus, by way of example, the one or more zeolites and/or zeolite intergrowth phases having a GME framework structure crystallized in (ii) may comprise one or more zeolites selected from the group consisting of Gmelinite, [Be-P-O]-GME, K-rich Gmelinite, synthetic fault-free Gmelinite, and mixtures of two or more thereof, wherein preferably the one or more zeolites and/or zeolite intergrowth phases having a GME framework structure crystallized in (ii) is Gmelinite. Same applies accordingly relative to the one or more (optional) zeolites and/or zeolite intergrowth phases having a CHA framework structure crystallized in (ii), which may comprise one or more zeolites selected from the group consisting of (Ni(deta)$_2$)-UT-6, Chabazite, |Li-Na| [Al-Si-O]-CHA, DAF-5, Na-Chabazite, K-Chabazite, LZ-218, Linde D, Linde R, MeAPSO-47, Phi, SAPO-34, SAPO-47, SSZ-13, SSZ-62, UiO-21, Willhendersonite, ZK-14, ZYT-6, preferably from the group consisting of Chabazite, |Li-Na| [Al-Si-O]-CHA, Na-Chabazite, K-Chabazite, SAPO-34, SAPO-47, SSZ-13, SSZ-62, and combinations of two or more thereof, more preferably from the group consisting of Chabazite, |Li-Na| [Al-Si-O]-CHA, Na-Chabazite, SAPO-34, SSZ-13, and combinations of two or more thereof, more preferably from the group consisting of Na-Chabazite, SAPO-34, SSZ-13, and combinations of two or more thereof. According to the present invention it is however particularly preferred that the one or more (optional) zeolites and/or zeolite intergrowth phases having a CHA framework structure crystallized in (ii) comprises Chabazite and preferably comprises Na-Chabazite.

The present invention furthermore relates to a catalyst for selective catalytic reduction of NOx which is either obtained by the process according to the present invention or by any conceivable process which leads to a catalyst as obtainable according to the inventive process. Therefore, the present invention also relates to a catalyst for the selective catalytic reduction of NOx comprising a zeolitic material, said zeolitic material comprising one or more zeolites having a GME framework structure and optionally further comprising one or more zeolites having a CHA framework structure, as obtainable and/or obtained according to the process as defined in any of the particular and preferred embodiments of the inventive process in the present application.

Furthermore, the present invention also relates to a catalyst for the selective catalytic reduction of NOx comprising a zeolitic material as such, said zeolitic material comprising (A) one or more zeolites having a GME framework structure containing $YO_2$ and $X_2O_3$, and optionally further comprising one or more zeolites having a CHA framework structure containing $YO_2$ and $X_2O_3$ and/or comprising (B) one or more zeolite intergrowth phases of one or more zeolites having a GME framework structure containing $YO_2$ and $X_2O_3$ and one or more zeolites having a CHA framework structure containing $YO_2$ and $X_2O_3$, wherein Y is a tetravalent element, and X is a trivalent element, and wherein the zeolitic material contains Cu and/or Fe, preferably Cu, as non-framework elements, preferably at the ion-exchange sites of the zeolitic material, in an amount ranging from 0.1 to 15 wt.-% calculated as the element and based on 100 wt.-% of $YO_2$ contained in the zeolitic material, wherein preferably the catalyst is obtainable and/or obtained according to the process of any of the particular and preferred embodiments of the inventive process in the present application.

As regards the copper and/or iron contained as non-framework elements in the zeolitic material, there is in principle no particular restriction as to the amounts in which these may be contained in the zeolitic material provided that the value is contained in the range of from 0.1 to 15 wt.-% based on 100 wt.-% of $YO_2$ contained in the zeolitic material. Thus, by way of example, the amount of copper and/or iron contained in the zeolitic material as non-framework elements may range anywhere from 0.5 to 10 wt.-% based on 100 wt.-% of $YO_2$ contained in the zeolitic material, wherein preferably the amount of copper and/or iron ranges from 1 to 8 wt.-%, more preferably from 1.5 to 6 wt.-%, more preferably from 2 to 5 wt.-%, more preferably from 2.5 to 4.5 wt.-%, more preferably from 3 to 4 wt.-%, and more preferably from 3.3 to 3.8 wt.-%. According to the present invention it is particularly preferred that the amount of copper and/or iron contained as non-framework elements in the zeolitic material ranges from 3.5 to 3.7 wt.-% based on 100 wt.-% of $YO_2$ contained in the zeolitic material.

As regards the $YO_2:X_2O_3$ molar ratio of the zeolitic material comprised in the catalyst for selective catalytic reduction, no particular restrictions apply such that in principle the zeolitic material may display any possible $YO_2:X_2O_3$ molar ratio. Thus, by way of example, the $YO_2:X_2O_3$ molar ratio of the zeolitic material may range anywhere from 2 to 50, wherein preferably the $YO_2:X_2O_3$ molar ratio ranges from 3 to 30, more preferably from 4 to 20, more preferably from 4.5 to 15, more preferably from 5 to 12, more preferably from 5.5 to 9, more preferably from 5.8 to 7. According to the present invention it is particularly preferred that the $YO_2:X_2O_3$ molar ratio of the zeolitic material ranges from 6 to 6.2.

According to the present invention the zeolitic material contained in the catalyst for selective catalytic reduction of NOx may optionally further comprise one or more zeolites having a CHA framework structure in addition to the one or more zeolites having a GME framework structure. According to the present invention it is however preferred that the zeolitic material comprises one or more zeolites having a CHA framework structure in addition to one or more zeolites having a GME framework structure and/or that the zeolitic material comprises one or more zeolite intergrowth phases of one or more zeolites having a GME framework structure and one or more zeolites having a CHA framework structure. As regards said preferred embodiments of the present invention, there is in principle no particular restriction as to the amount of the one or more zeolites having a CHA framework structure in the zeolitic material together with one or more zeolites having a GME framework structure and/or in the one or more intergrowth phases of the one or more zeolites having a GME framework structure with one or more zeolites having a CHA framework structure.

As regards the preferred embodiments of the present invention wherein the zeolitic material of the inventive catalyst comprises one or more zeolites having a CHA framework structure as such or as contained in one or more zeolite intergrowth phases of one or more zeolites having a GME framework structure and one or more zeolites having a CHA framework structure, there is, in principle, no restriction relative to the amounts in which the CHA framework structure may be contained in said zeolitic material. Thus, by way of example, the relative amount of the CHA framework structure in the zeolitic material of the inventive catalyst comprising the one or more zeolites having a GME framework structure and the one or more zeolites having a CHA framework structure and/or the one or more zeolite intergrowth phases thereof may range anywhere from 0.5 to 99% based on 100% of the phases in the zeolitic material having a GME and/or CHA framework structure, wherein according to the present invention it is preferred that the relative amount ranges from 1 to 95%, and more preferably from 5 to 80%, more preferably from 10 to 60%, more preferably from 15 to 50%, and more preferably from 20 to 45%. According to the inventive process it is particularly preferred that the relative amount of the CHA framework structure in the zeolitic material of the inventive catalyst comprising the one or more zeolites having a GME framework structure and the one or more zeolites having a CHA framework structure and/or the one or more zeolite intergrowth phases thereof ranges from 25 to 40% based on 100% of the phases in the zeolitic material having a GME and/or CHA framework structure. As regards the values for the relative amount of the CHA framework structure in the zeolitic material of the inventive catalyst, although there is no particular restriction as to the method according to which said relative amount is determined, it is preferred according to the present invention that the values thereof as defined in the present application reflect the values as determined from the X-ray powder diffraction pattern of the zeolitic material of the inventive catalyst, using the Relative Intensity Ratio (RIR) method, and based on 100% of the phases in the zeolitic material having a GME and/or CHA framework structure.

It is, however, alternatively preferred according to the present invention that the zeolitic material of the inventive catalyst contains substantially no zeolites and/or no zeolite phases having a CHA framework structure, and preferably contains substantially no zeolites and no zeolite phases having a CHA framework structure. According to the present invention, the term "substantially no zeolites having a CHA framework structure" as well as the term "substantially no zeolite phases having a CHA framework structure" indicates an amount of 0.1 wt.-% or less of zeolites and/or zeolite phases having a CHA framework structure in the zeolitic material comprised in the catalyst based on 100 wt.-% of the zeolitic material contained in the catalyst. It is, however, preferred according to the present invention that the aforementioned terms indicate an amount of 0.05 wt.-% or less of zeolites and/or zeolite phases having a CHA framework structure in the zeolitic material comprised in the catalyst, and more preferably of 0.001 wt.-% or less, more preferably 0.0005 wt.-% or less, and even more preferably 0.0001 wt.-% or less thereof. Alternatively, according to the present invention the terms "substantially no zeolites having a CHA framework structure" as well as the term "substantially no zeolite phases having a CHA framework structure" respectively indicate a relative amount of CHA framework structure in the zeolitic material comprising one or more zeolites having a GME framework structure and/or in the one or more zeolite intergrowth phases thereof of less than 0.5% as determined using the X-ray powder diffraction pattern of the zeolitic material of the inventive catalyst using the Relative Intensity Ratio (RIR) method, and based on 100% of the phases in the zeolitic material having a GME framework structure, and preferably of less than 0.1%, more preferably of 0.05%, and more preferably of 0.01%.

Concerning the further components which may be comprised in the inventive catalyst in addition to the zeolitic material loaded with copper and/or iron, no restrictions applied such that in principle any conceivable further elements or compounds may be contained therein. According to the present invention it is, however, preferred that the framework of the zeolitic material of the inventive catalyst contains substantially no phosphorous, wherein preferably the zeolitic material of the catalyst contains substantially no phosphorous or phosphorous containing compounds, wherein more preferably the catalyst as such contains substantially no phosphorous or phosphorous containing compounds. Within the meaning of the present invention, "substantially" as employed in the present invention with respect to the amount of phosphorous contained in the framework of the zeolitic material of the inventive catalyst indicates an amount of 0.1 wt.-% or less of phosphorous calculated as the element and based on 100 wt.-% of $YO_2$ in the zeolitic material of the inventive catalyst, preferably 0.05 wt.-% or less, more preferably 0.001 wt.-% or less, more preferably 0.0005 wt.-% or less, and even more preferably 0.0001 wt.-% or less thereof. Furthermore, within the meaning of the present invention, "substantially" as employed in the present invention with respect to the amount of phosphorous and/or phosphorous containing compounds contained in the zeolitic material of the inventive catalyst indicates an amount of 0.1 wt.-% or less of phosphorous and/or phosphorous containing compounds based on 100 wt.-% of the zeolitic material of the inventive catalyst, and preferably 0.05 wt.-% or less, more preferably 0.001 wt.-% or less, more preferably 0.0005 wt.-% or less, and even more preferably 0.0001 wt.-% or less thereof. Finally, within the meaning of the present invention, "substantially" as employed in the present invention with respect to the amount of phosphorous and/or phosphorous containing compounds contained in the inventive catalyst as such indicates an amount of 0.1 wt.-% or less of phosphorous and/or phosphorous containing compounds based on 100 wt.-% of the catalyst as such, and preferably 0.05 wt.-% or less, more preferably 0.001 wt.-% or less, more preferably 0.0005 wt.-% or less, and even more preferably 0.0001 wt.-% or less thereof.

According to the present invention, a zeolitic material comprising $YO_2$ in the framework of one or more zeolites having a GME framework structure and/or in an intergrowth phase thereof is comprised in the inventive catalyst. In principle, Y stands for any conceivable tetravalent element, Y standing for either or several tetravalent elements. Preferred tetravalent elements according to the present invention include Si, Sn, Ti, Zr, and Ge, and combinations thereof. More preferably, Y stands for Si, Ti, or Sn, or any combination of said tetravalent elements, even more preferably for Si, and/or Sn. According to the present invention, it is particularly preferred that Y stands for Si. Independently thereof, same applies accordingly with respect to the one or more optional zeolites having a CHA framework structure and/or intergrowth phase thereof comprised in the inventive catalyst.

Furthermore, the one or more zeolites having a GME framework structure and/or an intergrowth phase thereof comprises $X_2O_3$ in its framework structure. In principle, X stands for any conceivable trivalent element, X standing for either one or several trivalent elements. Preferred trivalent elements according to the present invention include Al, B, In, and Ga, and combinations thereof. More preferably, X stands for Al, B, or In, or any combination of said trivalent elements, even more preferably for Al and/or B. According to the present invention, it is particularly preferred that X stands for Al. Again, independently thereof, same applies accordingly with respect to the one or more optional zeolites having a CHA framework structure and/or intergrowth phase thereof comprised in the inventive catalyst.

There is no particular restriction according to the present invention as to the specific types of zeolites having a GME framework structure and/or an intergrowth phase thereof which may be comprised in the inventive catalyst. Thus, by way of example, the one or more zeolites and/or zeolite intergrowth phases having a GME framework structure contained in the zeolitic material may comprise one or more zeolites selected from the group consisting of Gmelinite, [Be-P-O]-GME, K-rich Gmelinite, synthetic fault-free Gmelinite, and mixtures of two or more thereof, wherein preferably the one or more zeolites and/or zeolite intergrowth phases having a GME framework structure contained in the zeolitic material is Gmelinite. Same applies accordingly relative to the one or more (optional) zeolites and/or zeolite intergrowth phases having a CHA framework structure contained in the zeolitic material of the inventive catalyst, which may comprise one or more zeolites selected from the group consisting of (Ni(deta)$_2$)-UT-6, Chabazite, |Li-Na| [Al-Si-O]-CHA, DAF-5, Na-Chabazite, K-Chabazite, LZ-218, Linde D, Linde R, MeAPSO-47, Phi, SAPO-34, SAPO-47, SSZ-13, SSZ-62, UiO-21, Willhendersonite, ZK-14, ZYT-6, preferably from the group consisting of Chabazite, |Li-Na| [Al-Si-O]-CHA, Na-Chabazite, K-Chabazite, SAPO-34, SAPO-47, SSZ-13, SSZ-62, and combinations of two or more thereof, more preferably from the group consisting of Chabazite, |Li-Na| [Al-Si-O]-CHA, Na-Chabazite, SAPO-34, SSZ-13, and combinations of two or more thereof, more preferably from the group consisting of Na-Chabazite, SAPO-34, SSZ-13, and combinations of two or more thereof. According to the present invention it is however particularly preferred that the one or more (optional) zeolites and/or zeolite intergrowth phases having a CHA framework structure contained in the zeolitic material comprises Chabazite and preferably comprises Na-Chabazite.

Therefore, it is particularly preferred according to the present invention that the one or more zeolites having a GME framework structure comprise Gmelinite, wherein the optional one or more zeolites having a CHA framework structure comprise Chabazite, wherein preferably Gmelinite is contained as the one or more zeolites having having a GME framework structure in the zeolitic material and Chabazite is contained as the optional one or more zeolites having a CHA framework structure in the zeolitic material In addition to relating to a method for the preparation of a catalyst and to a catalyst as such, the present invention further relates to a method for the selective catalytic reduction of NOx comprising:

(a) providing a catalyst comprising a catalyst according to any of the particular and preferred embodiments of the inventive catalyst as defined in the present application; and (b) contacting a gas stream comprising NOx with the catalyst provided in step (a).

According to the inventive method, it is preferred that the gas stream treated by contacting with the inventive catalyst comprises one or more reducing agents for selective catalytic reduction of NOx. To this effect, any suitable reducing agent or combination of reducing agents may be employed, provided that they may reduce NOx to nitrogen gas under the catalytic conditions provided by the inventive method. According to the inventive method it is however preferred that urea and/or ammonia is comprised among the reducing agents used, wherein more preferably urea and/or ammonia is employed as the reducing agent in the inventive method, preferably ammonia.

Therefore, it is preferred according inventive method that the gas stream further comprises one or more reducing agents, the one or more reducing agents preferably comprising urea and/or ammonia, preferably ammonia.

As regards the gas comprising NOx, there is no particular restriction according to the present invention as to how said gas stream is provided such that it may stem from any conceivable source. It is, however, preferred according to the present invention that the gas stream comprises a $NO_x$ containing waste gas stream from an internal combustion engine, preferably from an internal combustion engine which operates under lean-burn conditions, and more preferably from a lean-burn gasoline engine or from a diesel engine.

According to the present invention it is alternatively preferred that the gas stream comprises one or more NOx containing waste gases from one or more industrial processes, wherein more preferably the NOx containing waste gas stream comprises one or more waste gas streams obtained in processes for producing adipic acid, nitric acid, hydroxylamine derivatives, caprolactame, glyoxal, methylglyoxal, glyoxylic acid or in processes for burning nitrogeneous materials, including mixtures of waste gas streams from two or more of said processes.

Finally, the present invention also relates to the use of the inventive catalyst for the selective catalytic reduction of NOx, in particular in the field of catalysis and/or in the treatment of exhaust gas, wherein said exhaust gas treatment comprises industrial and automotive exhaust gas treatment. It is, however, preferred according to the present invention that inventive catalyst according to any of the particular and preferred embodiments defined in the present application is used as a catalyst for the selective catalytic reduction of NOx, and preferably in the treatment of NOx containing exhaust gas by SCR, wherein more preferably the catalyst is used in the treatment of industrial or automotive exhaust gas. According to the present invention it is particularly preferred that the inventive catalyst according to any of the particular and preferred embodiments defined in the present application is used in the treatment of automotive exhaust gas.

The present invention is further characterized by the following and particular preferred embodiments, including the combination and embodiments indicated by the respective dependencies:

1. A process for the production of a catalyst for the selective catalytic reduction of $NO_x$ comprising a zeolitic material, said zeolitic material comprising (A) one or more zeolites having a GME framework structure containing $YO_2$ and $X_2O_3$, and optionally further comprising one or more zeolites having a CHA framework structure containing $YO_2$ and $X_2O_3$ and/or comprising (B) one or more zeolite intergrowth phases of one or more zeolites having a GME framework structure containing $YO_2$ and $X_2O_3$ and one or more zeolites having a CHA framework structure containing $YO_2$ and $X_2O_3$, wherein Y is a tetravalent element, and X is a trivalent element, and wherein said process comprises:

(i) preparing a mixture comprising at least one source of $YO_2$, at least one source of $X_2O_3$, and optionally comprising seed crystals;

(ii) crystallizing the mixture prepared in (i) for obtaining a zeolitic material comprising one or more zeolites having a GME framework structure and optionally further comprising one or more zeolites having a CHA framework structure, and/or for obtaining a zeolitic material comprising one or more zeolite intergrowth phases of one or more zeolites having a GME framework structure and one or more zeolites having a CHA framework structure;

(iii) optionally isolating the zeolitic material obtained in (ii);

(iv) optionally washing the zeolitic material obtained in (ii) or (iii);

(v) optionally drying the zeolitic material obtained in (ii), (iii), or (iv);

(vi) subjecting the zeolitic material obtained in (ii), (iii), (iv), or (v) to an ion-exchange procedure, wherein at least one ionic non-framework element or compound contained in the zeolitic material is ion-exchanged against Cu and/or Fe, preferably against Cu.

2. The process of embodiment 1, wherein in (iii) isolating the zeolitic material includes a step of spray-drying the zeolitic material obtained in (ii), and/or wherein in (v) drying of the zeolitic material includes a step of spray-drying the zeolitic material obtained in (ii), (iii), or (iv).

3. The process of embodiment 1 or 2, wherein in (vi) the zeolitic material is ion-exchanged such as to obtain a loading of Cu and/or Fe in the zeolitic material ranging from 0.1 to 15 wt.-% calculated as the element and based on 100 wt.-% of $YO_2$ contained in the zeolitic material, preferably from 0.5 to 10 wt.-%, more preferably from 1 to 8 wt.-%, more preferably from 1.5 to 6 wt.-%, more preferably from 2 to 5 wt.-%, more preferably from 2.5 to 4.5 wt.-%, more preferably from 3 to 4 wt.-%, more preferably from 3.3 to 3.8 wt.-%, and more preferably from 3.5 to 3.7 wt.-%.

4. The process of any of embodiments 1 to 3, wherein in (vi) the step of subjecting the zeolitic material to an ion-exchange procedure includes the steps of
   (vi.a) subjecting the zeolitic material obtained in (ii), (iii), (iv), or (v) to an ion-exchange procedure, wherein at least one ionic non-framework element or compound contained in the zeolitic material is ion-exchanged against $NH_4^+$;
   (vi.b) calcining the ion-exchanged zeolitic material obtained in (vi.a) for obtaining the H-form of the zeolitic material;
   (vi.c) subjecting the zeolitic material obtained in (vi.b) to an ion-exchange procedure, wherein H+ contained in the zeolitic material as ionic non-framework element is ion-exchanged against Cu and/or Fe.

5. The process of any of embodiments 1 to 4, wherein Y is selected from the group consisting of Si, Sn, Ti, Zr, Ge, and combinations of two or more thereof, Y preferably being Si.

6. The process of any of embodiments 1 to 5, wherein the at least one source for $YO_2$ comprises one or more compounds selected from the group consisting of silicas, silicates, and mixtures thereof,
   preferably from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, tetraalkoxysilanes, and mixtures of two or more thereof,
   more preferably from the group consisting of fumed silica, silica hydrosols, silica gel, silicic acid, water glass, colloidal silica, pyrogenic silica, silicic acid esters, tetraalkoxysilanes, and mixtures of two or more thereof,
   more preferably from the group consisting of silica hydrosols, silicic acid, water glass, colloidal silica, silicic acid esters, tetraalkoxysilanes, and mixtures of two or more thereof,
   more preferably from the group consisting of water glass, colloidal silica, silicic acid esters, tetraalkoxysilanes, and mixtures of two or more thereof
   more preferably from the group consisting of water glass, colloidal silica, and mixtures thereof,
   wherein more preferably the at least one source of $YO_2$ is selected from the group consisting of water glass, colloidal silica, and mixtures thereof, wherein more preferably water glass is employed as the source of $YO_2$.

7. The process of any of embodiments 1 to 6, wherein X is selected from the group consisting of Al, B, In, Ga, and combinations of two or more thereof, X preferably being Al.

8. The process of any of embodiments 1 to 7, wherein the at least one source for $X_2O_3$ comprises one or more aluminum salts, preferably an aluminate of an alkali metal, wherein the alkali metal is preferably selected from the group consisting of Li, Na, K, Rb, and Cs, wherein more preferably the alkali metal is Na and/or K, and wherein even more preferably the alkali metal is Na.

9. The process of any of embodiments 1 to 8, wherein the $YO_2:X_2O_3$ molar ratio of the mixture prepared in (i) ranges from 2 to 50, preferably from 4 to 30, more preferably from 6 to 25, more preferably from 8 to 20, more preferably from 9 to 18, more preferably from 10 to 16, more preferably from 10.5 to 14, and more preferably from 11 to 12.

10. The process of any of embodiments 1 to 9, wherein the seed crystals comprise one or more zeolites having a GME and/or CHA framework structure, preferably one or more zeolites having a CHA framework structure.

11. The process of any of embodiments 1 to 10, wherein the amount of seed crystals in the mixture prepared in (i) ranges from 0.1 to 20 wt.-% based on 100 wt.-% of $YO_2$ contained in the mixture, preferably from 0.5 to 15 wt.-%, more preferably from 1 to 12 wt.-%, more preferably from 1.5 to 10 wt.-%, more preferably from 2 to 8 wt.-%, more preferably from 2.5 to 6 wt.-%, and more preferably from 3 to 4 wt.-%.

12. The process of any of embodiments 1 to 11, wherein the mixture prepared in (i) further comprises a solvent system containing one or more solvents, wherein the solvent system preferably comprises one or more solvents selected from the group consisting of polar protic solvents and mixtures thereof,
   preferably from the group consisting of n-butanol, isopropanol, propanol, ethanol, methanol, water, and mixtures thereof,
   more preferably from the group consisting of ethanol, methanol, water, and mixtures thereof,
   wherein more preferably the solvent system comprises water, and wherein more preferably water is used as the solvent system, preferably deionized water.

13. The process of embodiment 12, wherein the mixture prepared in (i) comprises water as the solvent system, wherein the $H_2O:YO_2$ molar ratio of the mixture prepared in (i) preferably ranges from 3 to 28, preferably from 4 to 24, more preferably from 5 to 22, more preferably from 6 to 18, more preferably from 7 to 14, and more preferably from 8 to 10.

14. The process of any of embodiments 1 to 13, wherein the mixture prepared in (i) further comprises one or more alkali metals M, preferably one or more alkali metals M selected from the group consisting of Li, Na, K, Cs, and mixtures thereof, wherein more preferably the mixture prepared in (i) further comprises Na and/or K, more preferably Na as the alkali metal M.

15. The process of embodiment 14, wherein the $M:YO_2$ molar ratio in the mixture prepared in (i) ranges from 0.1 to 2, preferably from 0.3 to 1.5, more preferably from 0.4 to 1.2, more preferably from 0.5 to 1, more preferably from 0.55 to 0.9, more preferably from 0.6 to 0.8, and more preferably from 0.65 to 0.75.

16. The process of embodiment 14 or 15, wherein the $YO_2:X_2O_3:M$ molar ratio of the mixture prepared in (i) ranges from 1:(0.02-0.5):(0.1-2), preferably from 1:(0.035-0.25):(0.3-1.5), more preferably from 1:(0.05-0.125):(0.4-1.2), more preferably from 1:(0.055-0.11):(0.5-1), more preferably from 1:(0.065-0.1):(0.55-0.9), more preferably from 1:(0.075-0.095):(0.6-0.8), and more preferably from 1:(0.085-0.09):(0.65-0.75).

17. The process of any of embodiments 1 to 16, wherein the crystallization in (ii) involves heating of the mixture prepared in (i), preferably to a temperature ranging from 75 to 210° C., more preferably from 85 to 190° C., more preferably from 90 to 170° C., more preferably from 95 to 150° C., more preferably from 100 to 140° C., and more preferably from 110 to 130° C.

18. The process of any of embodiments 1 to 17, wherein the crystallization in (ii) is conducted under autogenous pressure, preferably under solvothermal conditions, and more preferably under hydrothermal conditions.

19. The process of any of embodiments 1 to 18, wherein the crystallization in (ii) involves heating of the mixture prepared in (i) for a period in the range of from 24 to 240 h, more preferably from 36 to 200 h, more preferably from 48 to 180 h, more preferably from 75 to 160 h, and more preferably from 100 to 140 h.

20. The process of any of embodiments 1 to 19, wherein the crystallization in step (ii) involves agitating the mixture, preferably by stirring.

21. The process of any of embodiments 1 to 20, wherein the one or more zeolites and/or zeolite intergrowth phases having a GME framework structure crystallized in (ii) is Gmelinite, and wherein the one or more zeolites and/or zeolite intergrowth phases having a CHA framework structure crystallized in (ii) is Chabazite.

22. The process of any of embodiments 1 to 21, wherein the seed crystals comprise one or more zeolites having a GME framework structure, one or more zeolites having a CHA framework structure, and/or one or more zeolite intergrowth phases of one or more zeolites having a GME framework structure and one or more zeolites having a CHA framework structure, as obtained in (ii), (iii), (iv), or (v) according to any of embodiments 1 to 21.

23. The process of any of embodiments 1 to 22, wherein the mixture prepared in (i) is crystallized in (ii)
for obtaining a zeolitic material comprising one or more zeolites having a GME framework structure and further comprising one or more zeolites having a CHA framework structure, and/or
for obtaining a zeolitic material comprising one or more zeolite intergrowth phases of one or more zeolites having a GME framework structure and one or more zeolites having a CHA framework structure.

24. The process of embodiment 23, wherein the relative amount of the CHA framework structure in the zeolitic material obtained in (ii) as calculated from the X-ray powder diffraction pattern of the zeolitic material using the Relative Intensity Ratio (RIR) method, and based on 100% of the phases in the zeolitic material having a GME and/or CHA framework structure, ranges from 0.5 to 99%, preferably from 1 to 95%, more preferably from 5 to 80%, more preferably from 10 to 60%, more preferably from 15 to 50%, more preferably from 20 to 45%, and more preferably from 25 to 40%.

25. The process of any of embodiments 1 to 22, wherein the mixture prepared in (i) is crystallized in (ii) for obtaining a zeolitic material comprising one or more zeolites having a GME framework structure, wherein the zeolitic material contains substantially no zeolites and/or no zeolite phases having a CHA framework structure, preferably substantially no zeolites and no zeolite phases having a CHA framework structure.

26. The process of any of embodiments 1 to 25, wherein the mixture prepared in (i) contains substantially no phosphorous and/or phosphorous containing compounds.

27. The process of any of embodiments 1 to 26, wherein the framework of the zeolitic material obtained in (ii) contains substantially no phosphorous, wherein preferably the zeolitic material obtained in (ii) contains substantially no phosphorous and/or phosphorous containing compounds.

28. A catalyst for the selective catalytic reduction of $NO_x$ comprising a zeolitic material, said zeolitic material comprising one or more zeolites having a GME framework structure and optionally further comprising one or more zeolites having a CHA framework structure, as obtainable and/or obtained according to the process of any of embodiments 1 to 27.

29. A catalyst for the selective catalytic reduction of $NO_x$ comprising a zeolitic material, said zeolitic material comprising
(A) one or more zeolites having a GME framework structure containing $YO_2$ and $X_2O_3$, and optionally further comprising one or more zeolites having a CHA framework structure containing $YO_2$ and $X_2O_3$
and/or comprising
(B) one or more zeolite intergrowth phases of one or more zeolites having a GME framework structure containing $YO_2$ and $X_2O_3$ and one or more zeolites having a CHA framework structure containing $YO_2$ and $X_2O_3$,
wherein Y is a tetravalent element, and X is a trivalent element, and wherein the zeolitic material contains Cu and/or Fe as non-framework elements, preferably at the ion-exchange sites of the zeolitic material, in an amount ranging from 0.1 to 15 wt.-% calculated as the element and based on 100 wt.-% of $YO_2$ contained in the zeolitic material, preferably from 0.5 to 10 wt.-%, more preferably from 1 to 8 wt.-%, more preferably from 1.5 to 6 wt.-%, more preferably from 2 to 5 wt.-%, more preferably from 2.5 to 4.5 wt.-%, more preferably from 3 to 4 wt.-%, more preferably from 3.3 to 3.8 wt.-%, and more preferably from 3.5 to 3.7 wt.-%,
wherein preferably the catalyst is obtainable and/or obtained according to the process of any of embodiments 1 to 22.

30. The catalyst of embodiment 29, wherein the $YO_2$:$X_2O_3$ molar ratio of the zeolitic material ranges from 2 to 50, preferably from 3 to 30, more preferably from 4 to 20, more preferably from 4.5 to 15, more preferably from 5 to 12, more preferably from 5.5 to 9, more preferably from 5.8 to 7, and more preferably from 6 to 6.2.

31. The catalyst of embodiment 29 or 30, wherein the zeolitic material comprises one or more zeolites having a CHA framework structure containing $YO_2$ and $X_2O_3$ and/or wherein the zeolitic material comprises one or more zeolite intergrowth phases of one or more zeolites having a GME framework structure containing $YO_2$ and $X_2O_3$ and one or more zeolites having a CHA framework structure containing $YO_2$ and $X_2O_3$, wherein preferably the relative amount of the CHA framework structure in the zeolitic material as calculated from the X-ray powder diffraction pattern of the zeolitic material using the Relative Intensity Ratio (RIR) method, and based on 100% of the phases in the zeolitic material having a GME and/or CHA framework structure, ranges from 0.5 to 99%, preferably from 1 to 95%, more preferably from 5 to 80%, more preferably from 10 to 60%, more preferably from 15 to 50%, more preferably from 20 to 45%, and more preferably from 25 to 40%.

32. The catalyst of embodiment 29 or 30, wherein the zeolitic material contains substantially no zeolites and/or no zeolite phases having a CHA framework structure, preferably substantially no zeolites and no zeolite phases having a CHA framework structure.

33. The catalyst of any of embodiments 29 to 32, wherein the framework of the zeolitic material contains substantially no phosphorous, wherein preferably the zeolitic material contains substantially no phosphorous or phosphorous containing compounds, wherein more preferably the catalyst contains substantially no phosphorous or phosphorous containing compounds.

34. The catalyst of any of embodiments 29 to 33, wherein Y is selected from the group consisting of Si, Sn, Ti, Zr, Ge, and a mixture of two or more thereof, Y preferably being Si.

35. The catalyst of any of embodiments 29 to 34, wherein X is selected from the group consisting of Al, B, In, Ga, and a mixture of two or more thereof, X preferably being Al.

36. The catalyst of any of embodiments 29 to 35, wherein the one or more zeolites having a GME framework structure comprise Gmelinite, and wherein the optional one or more zeolites having a CHA framework structure comprise Chabazite, wherein preferably Gmelinite is contained as the one or more zeolites having having a GME framework structure in the zeolitic material and Chabazite is contained as the optional one or more zeolites having a CHA framework structure in the zeolitic material.

37. A method for the selective catalytic reduction of $NO_x$ comprising:
(a) providing a catalyst comprising a catalyst according to any of embodiments 28 to 36; and
(b) contacting a gas stream comprising $NO_x$ with the catalyst provided in step (a).

38. The method of embodiment 37, wherein the gas stream further comprises one or more reducing agents, the one or more reducing agents preferably comprising urea and/or ammonia, preferably ammonia.

39. The method of embodiment 37 or 38, wherein the gas stream comprises a $NO_x$ containing waste gas stream from an internal combustion engine, preferably from an internal combustion engine which operates under lean-burn conditions, and more preferably from a lean-burn gasoline engine or from a diesel engine.

40. The process of any of embodiments 37 to 39, wherein the gas stream comprises one or more $NO_x$ containing waste gases, preferably one or more $NO_x$ containing waste gases from one or more industrial processes, wherein more preferably the $NO_x$ containing waste gas stream comprises one or more waste gas streams obtained in processes for producing adipic acid, nitric acid, hydroxylamine derivatives, caprolactame, glyoxal, methyl-glyoxal, glyoxylic acid or in processes for burning nitrogeneous materials, including mixtures of waste gas streams from two or more of said processes.

41. Use of a catalyst according to any one of embodiments 28 to 36 in a catalytic process, preferably as a catalyst for the selective catalytic reduction of $NO_x$, and more preferably in the treatment of $NO_x$ containing exhaust gas by SCR, wherein more preferably the zeolitic material is used in the treatment of industrial or automotive exhaust gas, preferably in the treatment of automotive exhaust gas.

DESCRIPTION OF THE FIGURES

The X-ray diffraction (XRD) patterns shown in the Figures were respectively measured using Cu K alpha-1 radiation. In the respective diffractograms, the diffraction angle 2 theta in ° is shown along the abscissa and the intensities are plotted along the ordinate.

EXAMPLES

In the following examples, the relative amounts of the GME- and CHA-type framework structures in the respective samples were determined by X-ray diffraction quantification using the Relative Intensity Ratio (RIR) method as described in described in Chung, F. H. in Journal of Applied Crystallography, Volume 7, Issue 6, pages 519-525, December 1974, which is a standardless method without the need for calibration. To this effect, the Diffraction data for the analysis was collected on a D8 Advance Series II diffractometer (Bruker AXS GmbH, Karlsruhe). It was setup in Bragg-Brentano geometry using a LYNXEYE detector (window set to 3° opening). The data was collected using a fixed divergent slit set to 0.3° and an angular range from 5°(2q) to 70°(2q). The step width was set to 0.02°(2q) and the scan time chosen to achieve at least 50.000 counts peak intensity. The relative amounts of the respective GME and CHA framework phases in the samples were then determined by analysis of the X-ray diffraction data with the software package DIFFRAC.EVA V2 (Bruker AXS GmbH, Karlsruhe, see DIFFRAC.SUITE User Manual, DIFFRAC.EVA, 2011, pp. 111). The PDF Databases as described in Acta Cryst. (2002), B58, 333-337 were used to identify the crystalline phases within the samples. $I/I_{cor}$ values from respective entries in the databases were employed, these values describing the relative intensity of the strongest diffraction peak of the respective compound to the main reflection of corundum in a 50% mixture.

Reference Example 1: Preparation of a Zeolitic Material Having the GME and CHA Framework Structures In a teflon beaker, 8.26 g $NaAlO_2$ were dissolved in 92.52 g $H_2O$ (DI). Under stirring, 0.89 g Chabazite seed crystals (3 wt.-% based on $SiO_2$) are then dispersed followed by the slow addition of 69.69 g waterglass (26 wt-% $SiO_2$, 8 wt-% $Na_2O$, 66 wt-% $H_2O$). Finally, 28.97 g LUDOX AS 40 (40 wt-% $SiO_2$ in $H_2O$) is given in the stirred reaction mixture. The resulting reaction gel accordingly displays an $SiO_2$:$Al_2O_3$:$Na_2O$:$H_2O$ molar ratio of 40.3:3.5:12.0:750. The reaction mixture is then transferred into a static autoclave and is heated for 120 h to 120° C. Afterwards the dispersion is cooled down and the solid is separated from the supernatant by filtration and subsequent washing with $H_2O$ (DI) until a conductivity of 200 µS is reached. In order to fully remove the residual $H_2O$, the sample was dried for 16 h at 120° C. in a static oven under air. 56 g of a white powder was obtained.

Figure 1:
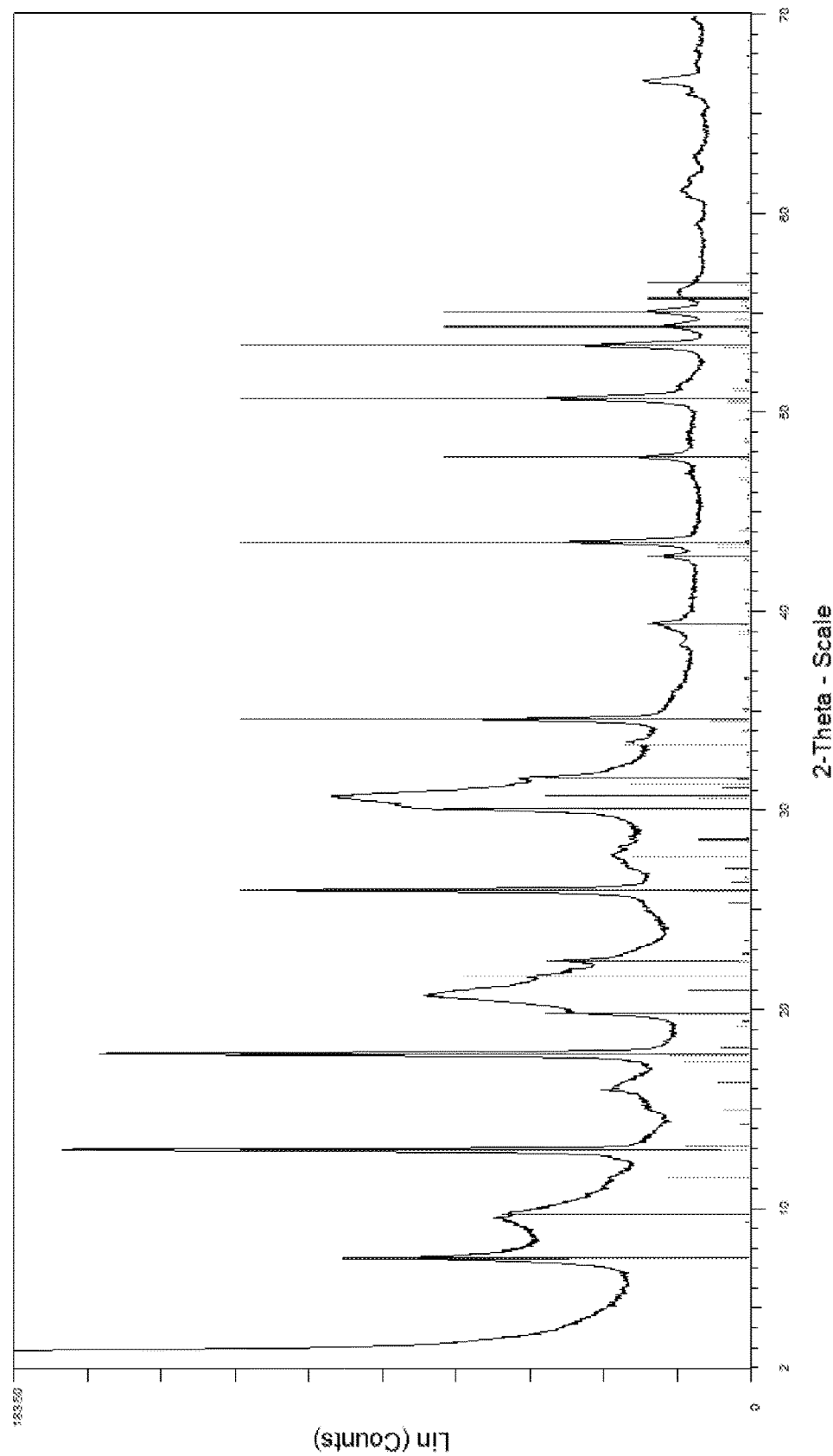
FIGS. 1-5 respectively show the X-ray diffraction pattern of the zeolitic material obtained from Reference Examples 1-5. As a reference, the diffractograms further include a line patterns which are typical for the respective GME- and CHA-type framework structures.

As may be taken from the X-ray diffraction of the obtained product displayed in FIG. 1, the product reveals a zeolitic material having both the GME and CHA framework structures wherein the relative amounts of the GME and CHA framework structures in the zeolitic material as determined using the Relative Intensity Ratio (RIR) method are respectively 50%. The crystallinity of the product as determined from the diffractogram was 57%.

Reference Example 2: Preparation of a Zeolitic Material Having the GME Framework Structure In a teflon beaker, 15.84 g $NaAlO_2$ were homogenized under stirring in 218.86 g waterglass (26 wt-% $SiO_2$, 8 wt-%

Na$_2$O, 66 wt-% H$_2$O). This results in a milky, white gel in which 5.84 g Chabazite seeds (10 wt.-% based on SiO$_2$) are added. The resulting reaction gel accordingly displays an SiO$_2$:Al$_2$O$_3$:Na$_2$O:H$_2$O molar ratio of 40.3:3.5:16.8:341. The reaction mixture is transferred into a static autoclave and is heated for 120 h to 120° C. Afterwards the dispersion is cooled down and the solid is separated from the supernatant by filtration and subsequent washing with H$_2$O (DI) until a conductivity of 200 µS is reached. In order to fully remove the residual H$_2$O, the sample was dried for 16 h at 120° C. in a static oven under air. 30 g of a white powder was obtained.

Figure 2:
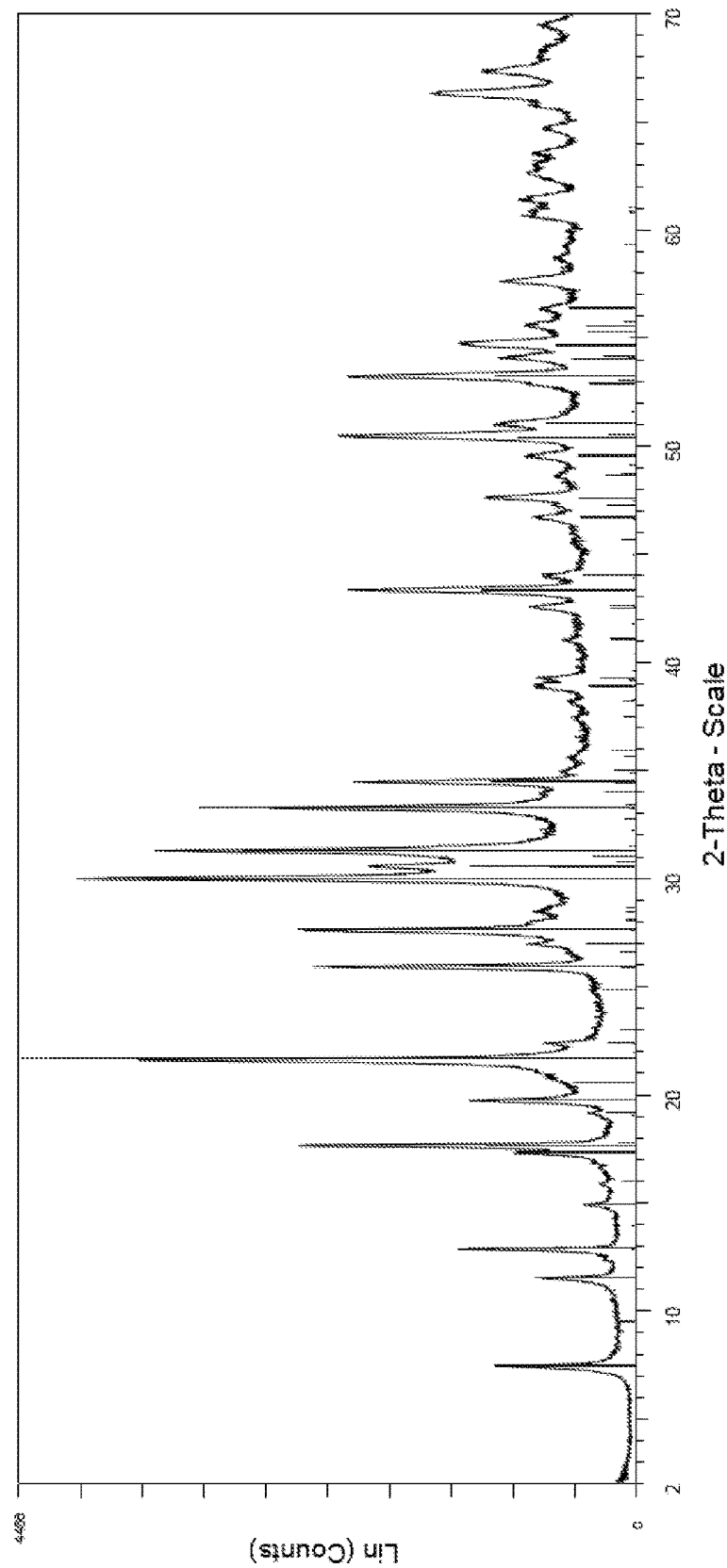

As may be taken from the X-ray diffraction of the obtained product displayed in FIG. 2, the product reveals a zeolitic material having a GME framework structure, practically no CHA phase being apparent in the diffractogram.

Reference Example 3: Preparation of a Zeolitic Material Having the GME and CHA Framework Structures In a teflon beaker, 9.60 g NaAlO$_2$ were homogenized under stirring in 185.81 g waterglass (26 wt-% SiO$_2$, 8 wt-% Na$_2$O, 66 wt-% H$_2$O). This results in a milky, white gel in which 4.95 g Chabazite seeds (10 wt.-% based on SiO$_2$) are added. The resulting reaction gel accordingly displays an SiO$_2$:Al$_2$O$_3$:Na$_2$O:H$_2$O molar ratio of 40.3:2.5:15.3:341. The reaction mixture is transferred into a static autoclave and is heated for 120 h to 120° C. Afterwards the dispersion is cooled down, and the solid is separated from the supernatant by filtration and subsequent washing with H$_2$O (DI) until a conductivity of 200 µS is reached. In order to fully remove the residual H$_2$O, the sample was dried for 16 h at 120° C. in a static oven under air. 30 g of a white powder was obtained.

Figure 3:
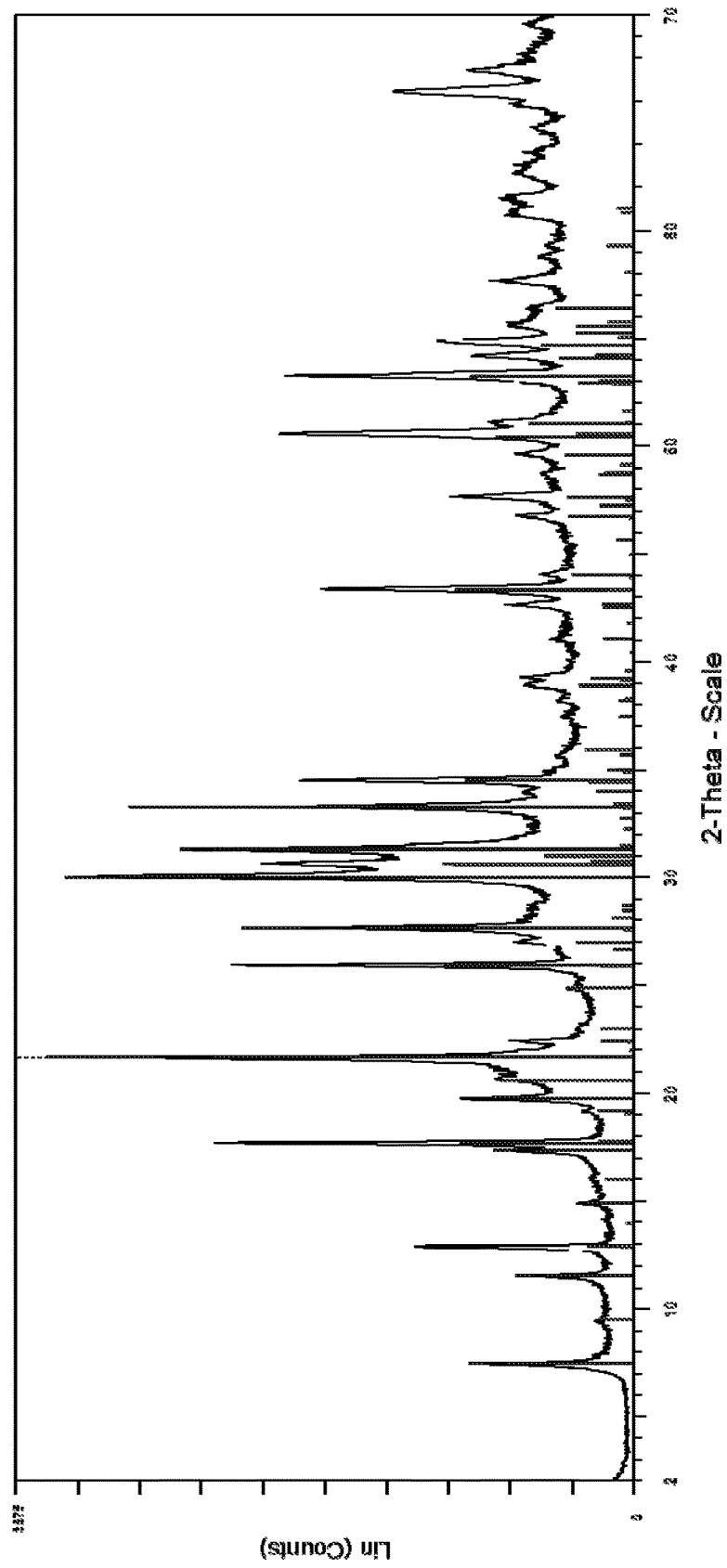

As may be taken from the X-ray diffraction of the obtained product displayed in FIG. 3, the product reveals a zeolitic material having mainly a GME framework structure, only minor amounts of phases having a CHA framework structure being apparent in the diffractogram.

Reference Example 4: Preparation of a Zeolitic Material Having the GME and CHA Framework Structures In a teflon beaker, 24.33 g NaAlO$_2$ were homogenized under stirring in 219.03 g waterglass (26 wt-% SiO$_2$, 8 wt-% Na$_2$O, 66 wt-% H$_2$O). This results in a milky, white gel in which 5.69 g Chabazite seeds (10 wt.-% based on SiO$_2$) are added. The resulting reaction gel accordingly displays an SiO$_2$:Al$_2$O$_3$:Na$_2$O:H$_2$O molar ratio of 40.3:3.5:16.9:341. The reaction mixture is transferred into a static autoclave and is heated for 120 h to 120° C. Afterwards the dispersion is cooled down, and the solid is separated from the supernatant by filtration and subsequent washing with H$_2$O (DI) until a conductivity of 200 µS is reached. In order to fully remove the residual H$_2$O, the sample was dried for 16 h at 120° C. in a static oven under air. 60 g of a white powder was obtained.

Figure 4:
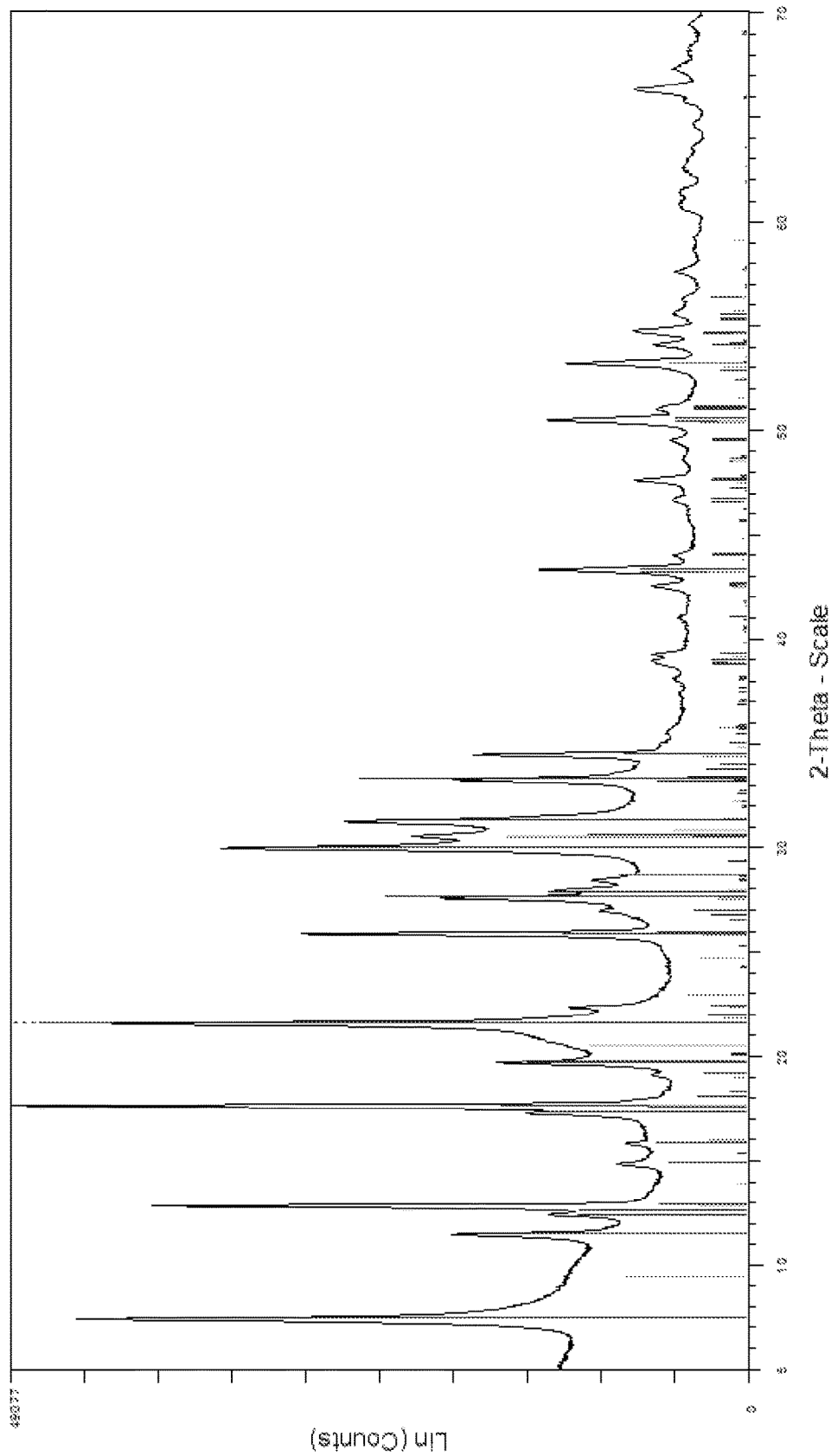
Figure 5:
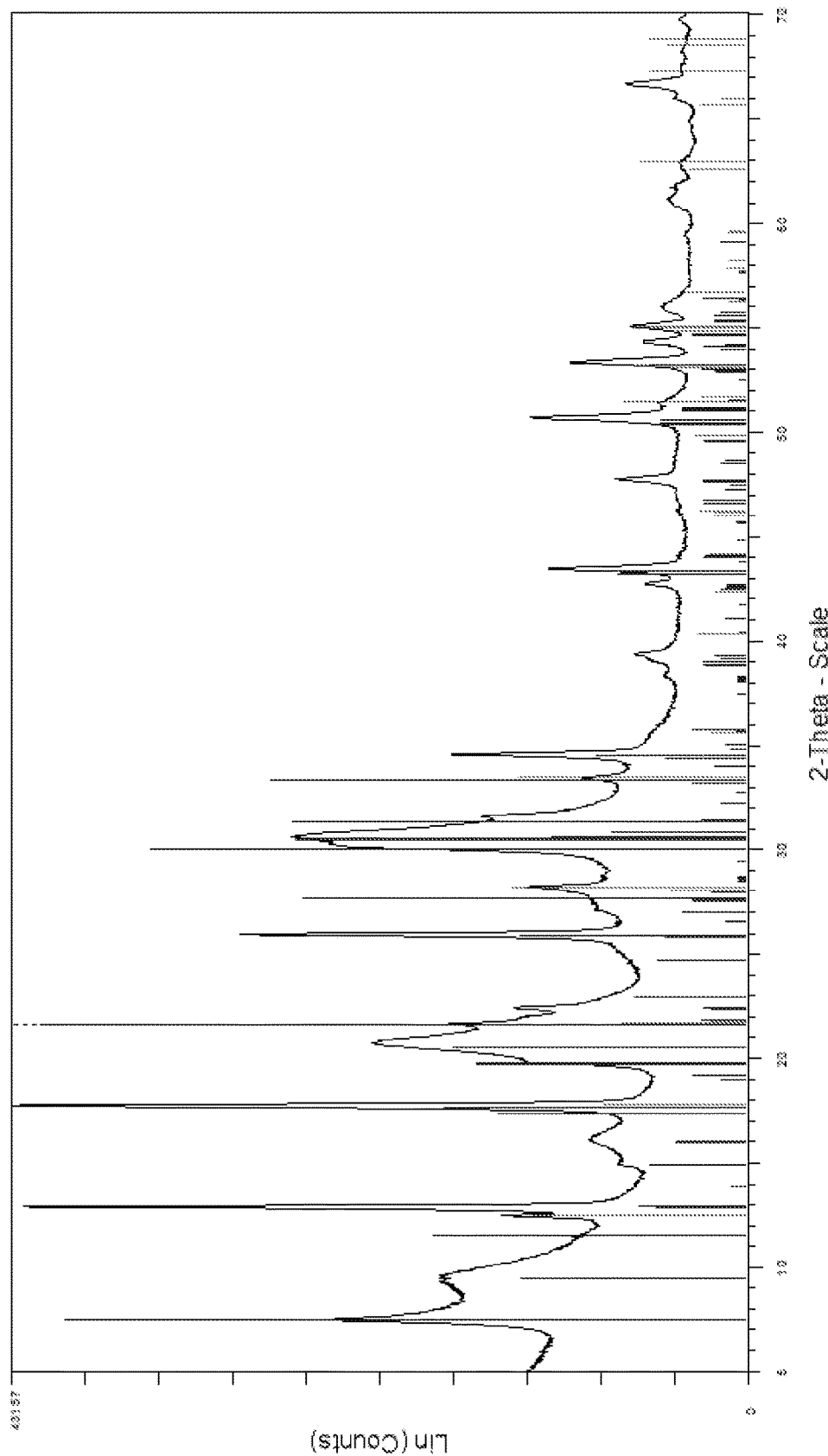

As may be taken from the X-ray diffraction of the obtained product displayed in FIG. 4, the product reveals a zeolitic material having both the GME and CHA framework structures wherein the relative amounts of the GME and CHA framework structures in the zeolitic material as determined using the Relative Intensity Ratio (RIR) method are respectively 73% GME and 15% CHA, a further phase being assigned to analcime as a side product. Accordingly, the relative amounts of GME and CHA based on the total (100%) of the GME and CHA phases in the sample as determined using the Relative Intensity Ratio (RIR) method are respectively 83% GME and 17% CHA. The crystallinity of the product as determined from the diffractogram was 71%.

Reference Example 5: Preparation of a Zeolitic Material Having the GME and CHA Framework Structures Without Employing Seed Crystals In a teflon beaker, 74.38 g NaAlO$_2$ were homogenized under stirring in 832.64 g waterglass (26 wt-% SiO$_2$, 8 wt-% Na$_2$O, 66 wt-% H$_2$O). This results in a milky, white gel. The resulting reaction gel accordingly displays an SiO$_2$:Al$_2$O$_3$:Na$_2$O:H$_2$O molar ratio of 40.3:3.5:12.0:705. No Chabazite seed crystals were added. The reaction mixture is transferred into a stirred autoclave and is heated for 60 h to 120° C. Afterwards the dispersion is cooled down, and the solid is separated from the supernatant by filtration and subsequent washing with H$_2$O (DI) until a conductivity of 200 µS is reached. In order to fully remove the residual H$_2$O, the sample was dried for 16 h at 120° C. in a static oven under air. 247 g of a white powder was obtained.

As may be taken from the X-ray diffraction of the obtained product displayed in FIG. 4, the product reveals a zeolitic material having both the GME and CHA framework structures wherein the relative amounts of the GME and CHA framework structures in the zeolitic material as determined using the Relative Intensity Ratio (RIR) method are respectively 47% GME and 45% CHA, in addition to minor impurities. Accordingly, the relative amounts of GME and CHA based on the total (100%) of the GME and CHA phases in the sample as determined using the Relative Intensity Ratio (RIR) method are respectively 51% GME and 49% CHA. The crystallinity of the product as determined from the diffractogram was 68%.

Reference Example 6: Preparation of a Zeolitic Material Having the GME and CHA Framework Structures In a teflon beaker 74.38 g NaAlO$_2$ were homogenized under stirring in 832.64 g waterglass (26 wt-% SiO$_2$, 8 wt-% Na$_2$O, 66 wt-% H$_2$O). This results in a milky, white gel in which 8.02 g Chabazite seeds (3.7 wt.-% based on SiO2) are added. The resulting reaction gel accordingly displays an SiO$_2$:Al$_2$O$_3$:Na$_2$O:H$_2$O molar ratio of 40.3:3.5:12.0:705. The reaction mixture is transferred into a stirred autoclave and is heated for 60 h to 120° C. Afterwards the dispersion is cooled down, and the solid is separated from the supernatant by filtration and subsequent washing with H$_2$O (DI) until a conductivity of 200 µS is reached. In order to fully remove the residual H$_2$O, the sample was dried for 16 h at 120° C. in a static oven under air. 121 g of a white powder was obtained.

As determined by X-ray diffraction, the product reveals a zeolitic material having mainly the CHA framework structure in addition to a phase having the GME framework structure. The relative amounts of the GME and CHA framework structures in the zeolitic material as determined using the Relative Intensity Ratio (RIR) method are 93% CHA and 7% GME. The crystallinity of the product as determined from the diffractogram was 71%.

Reference Example 7: Preparation of a Zeolitic Material Having the CHA Framework Structure 276.8 kg N,N,N-trimethylcyclohexylammoniumhydroxide (20 wt-% solution in H$_2$O) were mixed with 34.80 kg of aluminiumtriisopropylate and 77.99 kg tetramethylammoniumhydroxide (25 wt-% solution in $H_2O$). Afterwards, 358.32 kg LUDOX AS 40 (40 wt-% colloidal solution in $H_2O$) and 5.73 kg CHA seeds were added to the stirred mixture. The resulting gel was placed in a stirred autoclave with a total volume of 1600 L. The autoclave was heated within 7 h to 170° C. The temperature was kept constant for 18 h. Afterwards the autoclave was cooled down to room temperature. Then, the solids were separated by filtration and intensive washing until the washwater had a pH of 7. Finally the solid was dried for 10 hours at 120° C. The material was calcined at 550° C. for 5 hours.

Figure 6:
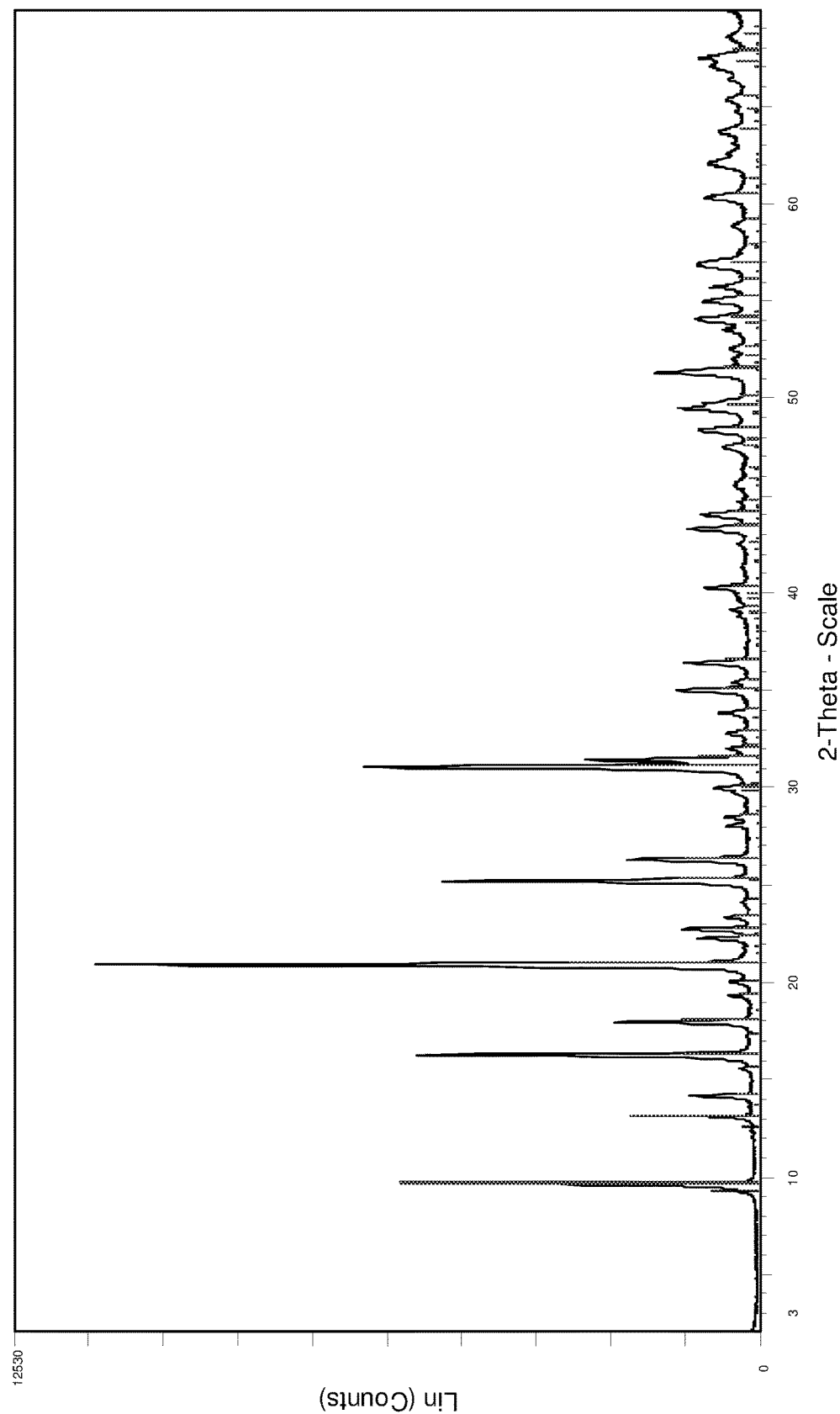
FIG. 6 displays the X-ray diffraction pattern of the calcined product obtained according to Reference Example 7. For comparative purposes, the line pattern of the CHA type framework structure is indicated in the diffractogram.

The characterization of the calcined material via XRD is displayed in FIG. 6 and displays the CHA-type framework structure. No phase having a GME framework structure is apparent in the diffractogram. The crystallinity of the product as determined from the diffractogram was 92%.

Example 1: Copper Ion Exchange of Reference Example 1

50 g of the zeolite powder obtained from Reference Example 1 were dispersed in a solution of 50 g $NH_4NO_3$ in 500 g $H_2O$ (DI). Under stirring, the mixture was heated for 2 hours to 80° C. Then, the solid was separated from the aqueous phase by filtration and subsequent washing with $H_2O$ until no nitrate can be detected in the washing water. The obtained white solid powder was dried at 120° C. for 16 h under air.

The ion-exchange was repeated one more time in order to remove the remaining $Na_2O$ from the synthesis quantitatively. Finally, the zeolite was transferred into the H-Form by means of calcination at 500° C. for 6 hours in a static oven under air.

The H-form of the sample as obtained after calcination was then subject to ion exchange with $Cu^{2+}$. To this effect, 49 g of the calcined zeolite powder was dispersed under stirring in 318 g $H_2O$ (DI). The dispersion was heated up to 60° C. After 30 min, 5.6 g $Cu^{2+}$-acetate-monohydrate were added together with 0.54 g acetic acid (70 wt-% solution in $H_2O$) in the aqueous phase. After 1 h reaction time, 238 g cold $H_2O$ were added rapidly into the mixture to stop the ion-exchange. The solid was filtered and washed with $H_2O$ (DI) until a conductivity of 200 μS was reached. The light blue powder was dried at 120° C. for 16 h for obtaining the copper ion exchanged product.

Elemental analysis of the copper ion-exchanged sample obtained afforded the following values: $SiO_2$=75.6 wt-%, $Al_2O_3$=20.9 wt-%, $Na_2O$=0.05 wt-%, and CuO=3.4 wt-%. The X-ray diffraction pattern of the copper-exchanged sample revealed relative amounts of the GME and CHA framework structures as determined using the Relative Intensity Ratio (RIR) method of 63% GME and 37% CHA. The crystallinity of the product as determined from the diffractogram was 55%.

Comparative Example 1: Copper Ion Exchange of Reference Example 7

The procedure of Example 1 was repeated with Reference Example 7 for affording a copper ion-exchanged comparative example having the CHA-type framework structure.

Example 2: SCR Testing

The copper-exchanged samples obtained in Example 1 and Comparative Example 1 were subsequently tested under selective catalytic reduction conditions relative to their NOx conversion capacity. To this effect the samples were contacted at various temperatures (200° C., 300° C., 450° C., and 600° C.) with a gas stream containing 500 ppm nitrogen oxide, 500 ppm ammonia, 5 volume percent water, 10 volume percent oxygen (as air) and balance nitrogen at a weight hourly space velocity (WHSV) of 80,000 $h^{-1}$. The samples were then aged at 650° C. for 50 hours in an atmosphere containing 10 volume percent of water, and then tested anew. The results of said testing are displayed in table 1 below.

TABLE 1

Results from selective catalytic reduction testing conducted on the powder samples.

| $NO_x$ conversion at: | fresh catalyst | | after aging at 650° C. | |
| --- | --- | --- | --- | --- |
| | Example 1 | Comp. Ex. 1 | Example 1 | Comp. Ex. 1 |
| 200° C. | 94% | 93% | 85% | 89% |
| 300° C. | 99% | 98% | 93% | 88% |
| 450° C. | 96% | 93% | 95% | 86% |
| 600° C. | 87% | 67% | 87% | 73% |

Thus, as may be taken from the results from selective catalytic reduction testing, it has surprisingly been found that the results obtained with the inventive sample clearly outperform those obtained with the comparative example, wherein the advantage is particularly pronounced at high temperatures. Furthermore, it has quite unexpectedly been found that the same applies after aging of the catalyst, such that the inventive catalyst effectively displays a superior performance during the entire lifetime of the catalyst for selective catalytic reduction. Thus, although after aging the activity of the inventive catalyst lies slightly below that of the comparative example at the lowest temperature of 200° C., the inventive catalyst clearly outperforms the comparative catalyst sample at all of the higher temperatures and in particular in the range of temperatures between 300 and 450° C. at which the highest conversion rates are observed for both the fresh and aged samples. Consequently, it has surprisingly been found that a copper loaded catalyst for selective catalytic reduction comprising a zeolite having the GME framework structure displays a clearly better performance in the abatement of $NO_x$ via selective catalytic reduction for comparable metal loading levels, in particular in the temperature range for which optimal conversion levels may be achieved.

The invention claimed is:

1. A process for producing a catalyst comprising a zeolitic material, the process comprising:
    crystallizing a mixture comprising a source of $SiO_2$, a source of $Al_2O_3$, and optionally comprising a seed crystal, to obtain a first zeolitic material comprising a GME framework zeolite and a CHA framework zeolite, and/or to obtain a second zeolitic material comprising a zeolite intergrowth phase comprising a GME framework zeolite and a CHA framework zeolite;
    optionally isolating the first and/or second zeolitic material;
    optionally washing the first and/or second zeolitic material;
and
    optionally drying the first and/or second zeolitic material;
    ion-exchanging the first and/or second zeolitic material with Cu and/or Fe; and obtaining the catalyst which is suitable for selective catalytic reduction of NOx,
wherein the zeolitic material of the catalyst comprises:
Cu and/or Fe; and
(A) a GME framework zeolite comprising $SiO_2$ and $Al_2O_3$, and a CHA framework zeolite comprising $SiO_2$ and $Al_2O_3$: and/or (B) a zeolite intergrowth phase comprising a GME framework zeolite comprising $SiO_2$ and $Al_2O_3$ and a CHA framework zeolite comprising $SiO_2$ and $Al_2O_3$, and
wherein a relative amount of the CHA framework zeolite in the zeolitic material, calculated from an X-ray powder diffraction pattern of the zeolitic material using a Relative Intensity Ratio method, and based on 100% of phases in the zeolitic material comprising the GME and CHA framework zeolite, is in a range of from 10 to 60%.

2. The process of claim 1, wherein the mixture in the crystallizing further comprises a solvent system comprising a solvent.

3. The process of claim 1, wherein the mixture in the crystallizing comprises substantially no phosphorous and/or phosphorous containing compounds.

4. A catalyst, produced by the process comprising:
crystallizing a mixture comprising a source of $SiO_2$, a source of $Al_2O_3$, and optionally comprising a seed crystal, to obtain a first zeolitic material comprising a GME framework zeolite and a CHA framework zeolite, and/or to obtain a second zeolitic material comprising a zeolite intergrowth phase comprising a GME framework zeolite and a CHA framework zeolite;
ion-exchanging the first and/or second zeolitic material with Cu and/or Fe; and
obtaining the catalyst which is suitable for selective catalytic reduction of NOx,
wherein the first and/or second zeolitic material of the catalyst comprises:
Cu and/or Fe: and
(A) a GME framework zeolite comprising $SiO_2$ and $Al_2O_3$ and a CHA framework zeolite comprising $SiO_2$ and $Al_2O_3$: and/or (B) a zeolite intergrowth phase comprising a GME framework zeolite comprising $SiO_2$ and $Al_2O_3$ and a CHA framework zeolite comprising $SiO_2$ and $Al_2O_3$, and
wherein a relative amount of the CHA framework zeolite in the zeolitic material, calculated from an X-ray powder diffraction pattern of the zeolitic material using a Relative Intensity Ratio method, and based on 100% of phases in the zeolitic material comprising the GME and CHA framework zeolite, is in a range of from 10% to 60%; and
wherein the zeolite material has a degree of crystallinity greater than 50%.

5. A catalyst, comprising a zeolitic material comprising:
(A) a zeolite having a GME framework structure comprising $SiO_2$ and $Al_2O_3$ and a zeolite having a CHA framework structure comprising $SiO_2$ and $Al_2O_3$, and/or
(B) a zeolite intergrowth phase of one or more zeolites having a GME framework structure comprising $SiO_2$ and $Al_2O_3$ and one or more zeolites having a CHA framework structure comprising $SiO_2$ and $Al_2O_3$,
wherein the zeolitic material comprises Cu and/or Fe as a non-framework element in a range of from 0.1 wt.-% to 15 wt.-% calculated as an element and based on 100 wt.-% of $SiO_2$ contained in the zeolitic material, and
wherein the catalyst is suitable for selective catalytic reduction of NOx, and wherein a relative amount of the CHA framework structure in the zeolitic material, calculated from an X-ray powder diffraction pattern of the zeolitic material using a Relative Intensity Ratio method, and based on 100% of phases in the zeolitic material comprising the GME and CHA framework structure, is in a range of from 10% to 60%; and
wherein the zeolite material has a degree of crystallinity greater than 50%.

6. The catalyst of claim 5, wherein a framework of the zeolitic material comprises substantially no phosphorous.

7. A method for selective catalytic reduction of NOx, the method comprising contacting a gas stream comprising NOx with the catalyst of claim 4.

8. A method, comprising:
contacting a gas stream comprising NOx with the catalyst according to claim 4.

9. The catalyst of claim 5, wherein the zeolitic material comprises (A) the zeolite having a GME framework structure comprising $SiO_2$ and $Al_2O_3$ and the zeolite having a CHA framework structure comprising $SiO_2$ and $Al_2O_3$.

10. The catalyst of claim 5, wherein the zeolitic material comprises (B) the zeolite intergrowth phase of one or more zeolites having a GME framework structure comprising $SiO_2$ and $Al_2O_3$ and the one or more zeolites having a CHA framework structure comprising $SiO_2$ and $Al_2O_3$.

11. The catalyst of claim 5, wherein the non-framework element comprises Cu.

12. The catalyst of claim 5, wherein the non-framework element comprises Fe.

13. The catalyst of claim 5, wherein the non-framework element comprises Cu and Fe.

14. The catalyst of claim 5, wherein Cu and/or Fe are present in a range of from 0.5 wt.-% to 10 wt.-%.

15. The catalyst of claim 5, wherein Cu and/or Fe are present in a range of from 2 wt.-% to 5 wt.-%.

16. The catalyst of claim 5, wherein the relative amount is in a range of from 15 to 50%.

17. The catalyst of claim 5, wherein the relative amount is in a range of from 20 to 45%.

18. The catalyst of claim 5, wherein the zeolitic material comprises the $SiO_2$ and the $Al_2O_3$ in an $SiO_2:Al_2O_3$ molar ratio in a range of from 2 to 50.

19. The catalyst of claim 5, wherein the zeolitic material comprises the $SiO_2$ and the $Al_2O_3$ in an $SiO_2:Al_2O_3$ molar ratio in a range of from 5 to 12.

* * * * *